(12) United States Patent
Ding et al.

(10) Patent No.: US 11,272,116 B2
(45) Date of Patent: Mar. 8, 2022

(54) PHOTOGRAPHING METHOD AND ELECTRONIC DEVICE

(71) Applicant: Honor Device Co., LTd., Shenzhen (CN)

(72) Inventors: Xin Ding, Beijing (CN); Chen Dong, Shenzhen (CN); Hongwei Hu, Beijing (CN); Yongtao Jiang, Shenzhen (CN); Wenmei Gao, Beijing (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/260,997

(22) PCT Filed: Sep. 18, 2018

(86) PCT No.: PCT/CN2018/106219
§ 371 (c)(1),
(2) Date: Jan. 16, 2021

(87) PCT Pub. No.: WO2020/015144
PCT Pub. Date: Jan. 23, 2020

(65) Prior Publication Data
US 2021/0266447 A1 Aug. 26, 2021

(30) Foreign Application Priority Data

Jul. 16, 2018 (CN) .......................... 201810775963.7

(51) Int. Cl.
*H04N 5/235* (2006.01)
*H04N 5/232* (2006.01)
(Continued)

(52) U.S. Cl.
CPC ......... *H04N 5/2353* (2013.01); *H04N 5/2222* (2013.01); *H04N 5/2351* (2013.01);
(Continued)

(58) Field of Classification Search
CPC ........... H04N 5/2353; H04N 5/232945; H04N 5/232935; H04N 5/2222; H04N 5/2351; H04N 5/58
(Continued)

(56) References Cited

U.S. PATENT DOCUMENTS

2007/0008326 A1* 1/2007 Levien ...................... G06T 1/00
345/501
2008/0106601 A1* 5/2008 Matsuda .......... H04N 5/232941
348/175

(Continued)

*Primary Examiner* — Usman A Khan
(74) *Attorney, Agent, or Firm* — Kilpatrick Townsend & Stockton LLP

(57) ABSTRACT

A photographing method of an electronic device is provided. The electronic device includes a display screen. In some embodiments, display screen displays an icon of a first application. In those embodiments, display screen displays a user interface of the first application in response to an operation on the icon, where the user interface includes a photographing button. The display screen also displays a photographing preview interface of a second application in response to an operation on the photographing button, where the second application is a camera application, and the photographing preview interface is used to display an image collected by the camera. When ambient light meets a photographing condition, the electronic device automatically photographs the image collected by the camera.

17 Claims, 19 Drawing Sheets

(51) Int. Cl.
*H04N 5/222* (2006.01)
*H04N 5/58* (2006.01)
(52) U.S. Cl.
CPC . *H04N 5/232935* (2018.08); *H04N 5/232945* (2018.08); *H04N 5/58* (2013.01)
(58) Field of Classification Search
USPC .......................................................... 348/362
See application file for complete search history.

(56) References Cited

U.S. PATENT DOCUMENTS

| | | | | |
|---|---|---|---|---|
| 2012/0169901 A1* | 7/2012 | Chang | ................... | H04N 5/2351 348/238 |
| 2014/0300779 A1* | 10/2014 | Yeo | ................... | H04N 5/232939 348/234 |
| 2017/0303043 A1* | 10/2017 | Young | ................... | H04R 1/406 |

* cited by examiner

| Luminous flux (unit: piece) | Exposure time (unit: second) | | | | | | |
|---|---|---|---|---|---|---|---|
| | 1/8 | 1/15 | 1/30 | 1/60 | 1/125 | 1/250 | 1/500 |
| ISO 50 | 64 | 32 | 16 | 8 | 4 | 2 | 1 |
| ISO 100 | 128 | 64 | 32 | 16 | 8 | 4 | 2 |
| ISO 200 | 256 | 128 | 64 | 32 | 16 | 8 | 4 |
| ISO 400 | 512 | 256 | 128 | 64 | 32 | 16 | 8 |
| ISO 800 | 1024 | 512 | 256 | 128 | 64 | 32 | 16 |
| ISO 1600 | 2048 | 1024 | 512 | 256 | 128 | 64 | 32 |
| ISO 3200 | 4096 | 2048 | 1024 | 512 | 256 | 128 | 64 |

FIG. 9A

PHOTOGRAPHING METHOD AND ELECTRONIC DEVICE

This application is a National Stage of International Application No. PCT/CN2018/106219, filed on Sep. 18, 2018, which claims priority to Chinese Patent Application No. 201810775963.7, filed on Jul. 16, 2018, both of which are hereby incorporated by reference in their entireties.

TECHNICAL FIELD

This application relates to the field of terminal technologies, and in particular, to a photographing method and an electronic device.

BACKGROUND

Currently, a user may use various applications installed on an electronic device (such as a smartphone or a tablet computer), to satisfy various requirements of the user. For example, the user may take a photo by using a camera application. In the prior art, the electronic device may perform photographing in response to a photographing operation of the user, after entering a photographing preview interface; or may automatically perform photographing after a delay of preset duration after entering a photographing preview interface.

Photo quality obtained in the foregoing photographing manner may be comparatively poor.

SUMMARY

Various embodiments provide a photographing method and an electronic device, to help improve photographing quality.

According to a first aspect, one embodiment provides a photographing method, applied to an electronic device, where the electronic device includes a display screen and a camera. Specifically, the display screen displays an icon of a first application; displays a user interface of the first application in response to an operation on the icon, where the user interface includes a photographing button; and displays a photographing preview interface of a second application in response to an operation on the photographing button. The second application is a camera application, and the photographing preview interface is used to display an image collected by the camera. Then, when ambient light meets a photographing condition, the electronic device automatically photographs the image collected by the camera.

In this embodiment, the electronic device can automatically perform photographing when the ambient light meets the photographing condition, thereby helping improve photographing quality.

In one design, the electronic device may determine, in any one of the following manners, that the ambient light meets the photographing condition:

Manner 1: An ambient light intensity is obtained from an ambient light sensor in the electronic device, and when the ambient light intensity is less than a first threshold, it is determined that an average grayscale value of a region-of-interest ROI image is greater than a second threshold, where the region-of-interest ROI image is obtained by the electronic device in the photographing preview interface. Compared with evaluating the ambient light by using only the ambient light intensity obtained from the ambient light sensor, this manner helps improve reliability of ambient light evaluation.

Manner 2: It is determined that ambient light intensity is greater than a fifth threshold. This manner helps simplify the photographing condition for ambient light evaluation.

In one design, in the foregoing manner 1, the second threshold may be obtained in the following manner in advance:

A first light sensitivity ISO and a first exposure time are obtained, where the first ISO is an ISO determined by the electronic device when the photographing preview interface is displayed, and the first exposure time is an exposure time determined by the electronic device when the photographing preview interface is displayed; a first luminous flux is determined based on the first ISO and the first exposure time; and then, the second threshold is determined based on the first luminous flux. The second threshold determined through this process better helps further improve reliability of ambient light evaluation.

In one design, a correspondence table between a luminous flux and a threshold may be preset in the electronic device. The correspondence table may include a first luminous flux range and a second luminous flux range. A minimum luminous flux value in the first luminous flux range is greater than a maximum luminous flux value in the second luminous flux range. The first luminous flux range corresponds to one threshold, and the second luminous flux range corresponds to another threshold. The threshold corresponding to the first luminous flux range is greater than the threshold corresponding to the second luminous flux range. Then, the correspondence table is queried based on the determined first luminous flux, to obtain, as the second threshold, a threshold corresponding to the first luminous flux. Presetting the correspondence table between a luminous flux and a threshold helps improve reliability of ambient light evaluation, and further helps reduce complexity of determining the second threshold.

In one design, when the ambient light does not meet the photographing condition, a user may be further notified that the current ambient light is insufficient. This helps improve interaction between the electronic device and the user, and helps improve user experience.

In one design, the electronic device may notify, in any one of the following manners, the user that the current ambient light is insufficient:

Manner 1: The user is notified, by using a voice, that the current ambient light is insufficient. This manner is more intuitive and effective, and helps simplify an implementation.

Manner 2: The display screen displays prompt information, where the prompt information is used to notify the user that the current ambient light is insufficient. This manner can avoid sound interference in a notification process, and helps simplify an implementation.

According to a second aspect, an embodiment of this application provides an electronic device, including a processor, a memory, a display screen, and a camera. The processor is coupled to the memory, the display screen, and the camera. The memory is configured to store a program instruction. The processor is configured to read the program instruction stored in the memory, to implement, in combination with the display screen and the camera, the method according to any one of the first aspect or the possible designs of the first aspect in embodiments of this application.

According to a third aspect, an embodiment of this application provides a computer storage medium. The computer storage medium stores a program instruction, and when the program instruction is run on an electronic device, the electronic device is enabled to perform the method according to any one of the first aspect or the possible designs of the first aspect in embodiments of this application.

According to a fourth aspect, an embodiment of this application provides a computer program product. When the computer program product is run on an electronic device, the electronic device is enabled to perform the method according to any one of the first aspect or the possible designs of the first aspect in embodiments of this application.

According to a fifth aspect, an embodiment of this application provides a chip. The chip is coupled to a memory in an electronic device, and controls the electronic device to perform the method according to any one of the first aspect or the possible designs of the first aspect in embodiments of this application.

In addition, for technical effects brought by the second aspect to the fifth aspect, refer to the descriptions in the first aspect. Details are not described herein again.

It should be noted that "coupling" in various embodiments means direct or indirect joining between two components.

BRIEF DESCRIPTION OF DRAWINGS

FIG. 9A is a schematic diagram of a correspondence table between an ISO, an exposure time, and a luminous flux according to an embodiment of this application;

DESCRIPTION OF EMBODIMENTS

It should be understood that, in various embodiments, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "I" generally indicates an "or" relationship between associated objects, and "at least one of the following (items)" or a similar expression means any combination of these items, including a single item (item) or any combination of a plurality of items (items). For example, at least one of a, b, or c may represent: a; b; c; a and b; a and c; b and c; or a, b, and c, where a, b, and c each may be singular or may be plural.

Various embodiments in accordance with the disclosure may be applied to an electronic device. In some embodiments, the electronic device may be a portable electronic device that includes a function such as a personal digital assistant function and/or a music player function, for example, a mobile phone, a tablet computer, a wearable device with a wireless communication function (such as a smartwatch or a smart band), or a vehicle-mounted device. An example embodiment of the portable electronic device includes but is not limited to a portable electronic device with iOS®, Android®, Microsoft®, or another operating system. The portable electronic device may alternatively be a laptop (Laptop) computer having a touch-sensitive surface (for example, a touch panel). It should be further understood that, in some other embodiments of this application, the electronic device may alternatively be a desktop computer having a touch-sensitive surface (for example, a touch panel).

Figure 1:
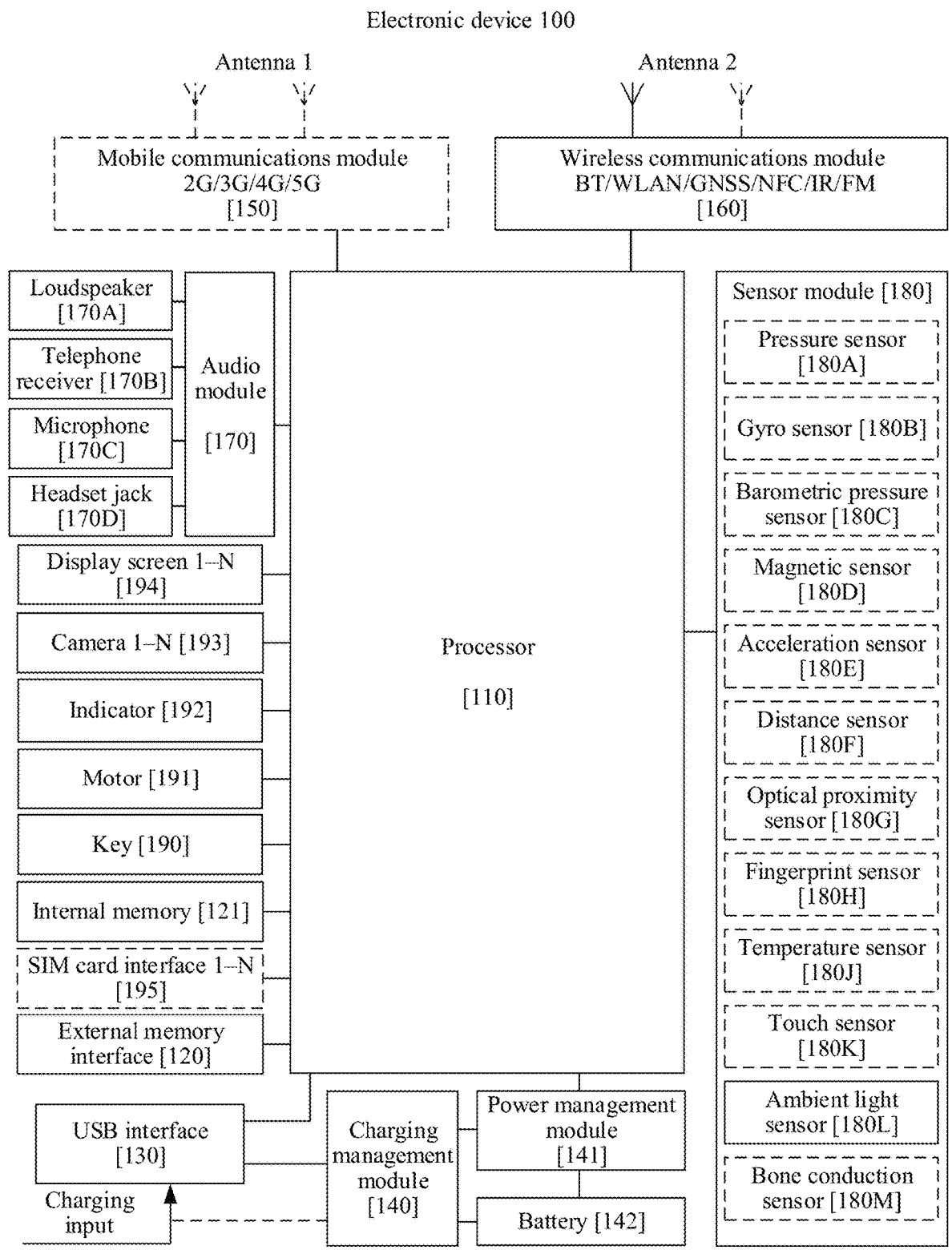
FIG. 1 is a schematic structural diagram of an electronic device according to an embodiment of this application.

FIG. 1 is a schematic structural diagram of an electronic device 100.

The electronic device 100 may include a processor 110, an external memory interface 120, an internal memory 121, a universal serial bus (universal serial bus, USB) interface 130, a charging management module 140, a power management module 141, a battery 142, an antenna 2, a wireless communications module 160, an audio module 170, a loudspeaker 170A, a telephone receiver 170B, a microphone 170C, a headset jack 170D, a sensor module 180, a key 190, a motor 191, an indicator 192, a camera 193, a display screen 194, and the like. The sensor module 180 includes an ambient light sensor 180L. In addition, the sensor module 180 may further include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, a bone conduction sensor 180M, and the like. In some other embodiments, the electronic device 100 in this embodiment of this application may further include an antenna 1, a mobile communications module 150, a subscriber identity module (subscriber identification module, SIM) card interface 195, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural network processor (neural-network processing unit, NPU). Different processing units may be independent components, or may be integrated into one or more processors.

In some embodiments, a memory may be further disposed in the processor 110, to store an instruction and data. For example, the memory in the processor 110 may be a cache. The memory may store an instruction or data that is just used or cyclically used by the processor 110. If the processor 110 needs to use the instruction or the data again, the processor 110 may directly invoke the instruction or the data from the memory. This avoids repeated access, and reduces a waiting time of the processor 110, thereby improving system efficiency.

In some other embodiments, the processor 110 may further include one or more interfaces. For example, the interface may be the universal serial bus (USB) interface 130. For another example, the interface may alternatively be an inter-integrated circuit (I2C) interface, an inter-integrated circuit sound (I2S) interface, a pulse code modulation (pulse code modulation, PCM) interface, a universal asynchronous receiver/transmitter (UART) interface, a mobile industry processor interface (MIPI), a general purpose input/output (GPIO) interface, a subscriber identity module (SIM) interface, or the like. It can be understood that, in this embodiment of this application, different modules of the electronic device 100 may be connected through an interface, so that the electronic device 100 can implement different functions, for example, photographing and processing. It should be noted that a connection manner of the interface in the electronic device 100 is not limited in this embodiment of this application.

The USB interface 130 is an interface that complies with a USB standard specification. For example, the USB interface 130 may include a mini USB interface, a micro USB interface, a USB type C interface, and the like. The USB interface 130 may be configured to connect to a charger to charge the electronic device 100, or may be configured to transmit data between the electronic device 100 and a peripheral device. The USB interface 130 may alternatively be configured to connect to a headset, to play audio by using the headset. The interface may alternatively be configured to connect to another electronic device, for example, an augmented reality (AR) device.

The charging management module 140 is configured to receive a charging input from a charger. The charger may be a wireless charger, or may be a wired charger. In some embodiments of wired charging, the charging management module 140 may receive a charging input of the wired charger through the USB interface 130. In some embodiments of wireless charging, the charging management module 140 may receive a wireless charging input by using a wireless charging coil of the electronic device 100. When the charging management module 140 is charging the battery 142, power may be further supplied to the electronic device by using the power management module 141.

The power management module 141 is configured to connect the battery 142, the charging management module 140, and the processor 110. The power management module 141 receives an input from the battery 142 and/or the charging management module 140, and supplies power to the processor 110, the internal memory 121, an external memory, the display screen 194, the camera 193, the wireless communications module 160, and the like. The power management module 141 may be further configured to monitor parameters such as a battery capacity, a quantity of battery cycles, and a battery health status. In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover a single communication frequency band or a plurality of communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a solution for wireless communication including 2G, 3G, 4G, 5G and the like, applied to the electronic device 100. The mobile communications module 150 may include at least one filter, a switch, a power amplifier, a low noise amplifier (LNA), and the like. The mobile communications module 150 may receive an electromagnetic wave by using the antenna 1, perform processing such as filtering and amplification on the received electromagnetic wave, and transmit the processed electromagnetic wave to the modem processor for demodulation. The mobile communications module 150 may further amplify a signal modulated by the modem processor, and the amplified signal is converted into an electromagnetic wave for radiation by using the antenna 1. In some embodiments, at least some of function modules in the mobile communications module 150 may be disposed in the processor 110. In some embodiments, at least some of function modules in the mobile communications module 150 may be disposed in a same component as at least some of modules in the processor 110.

The modem processor may include a modulator and a demodulator. The modulator is configured to modulate a to-be-sent low-frequency baseband signal into a medium-to-high-frequency signal. The demodulator is configured to demodulate a received electromagnetic wave signal into a low-frequency baseband signal. Then, the demodulator transfers the low-frequency baseband signal obtained through demodulation, to the baseband processor for processing. The low-frequency baseband signal is transferred to the application processor after being processed by the baseband processor. The application processor outputs a sound signal by using an audio device (not limited to the loudspeaker 170A, the telephone receiver 170B, and the like), or displays an image or a video by using the display screen 194. In some embodiments, the modem processor may be an independent component. In some other embodiments, the modem processor may be independent of the processor 110, and be disposed in a same component as the mobile communications module 150 or another function module.

The wireless communications module 160 may provide wireless communication solutions including a wireless local area network (WLAN) (for example, a wireless fidelity (Wi-Fi) network), Bluetooth (BT), a global navigation satellite system (GNSS), frequency modulation (FM), a near field communication (NFC) technology, and an infrared (IR) technology, applied to the electronic device 100. The wireless communications module 160 may be one or more components integrating at least one communications processor module. The wireless communications module 160 receives an electromagnetic wave signal by using the antenna 2, performs frequency modulation and filtering processing on the electromagnetic wave signal, and sends the processed signal to the processor 110. The wireless communications module 160 may further receive a to-be-sent signal from the processor 110, perform frequency modulation and amplification on the signal, and convert the frequency-modulated and amplified signal into an electromagnetic wave for radiation by using the antenna 2.

In some embodiments, the antenna 1 and the mobile communications module 150 of the electronic device 100 are coupled, and the antenna 2 and the wireless communications module 160 of the electronic device 100 are coupled, so that the electronic device 100 can communicate with a network and another device by using a wireless communications technology. The wireless communications technology may include, for example, a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, and/or an IR technology. The GNSS may include a global positioning system (GPS), a global navigation satellite system (GLONASS), a BeiDou navigation satellite system (beidou navigation satellite system, BDS), a quasi-zenith satellite system (QZSS), and/or a satellite based augmentation system (SBAS).

The electronic device 100 implements a display function by using the GPU, the display screen 194, the application processor, and the like. The GPU is a microprocessor for image processing, and is connected to the display screen 194 and the application processor. The GPU is configured to perform mathematical and geometric calculation, and is used for graphics rendering. The processor 110 may include one or more GPUs that execute a program instruction to generate or change display information.

The display screen 194 is configured to display an image, a video, and the like. The display screen 194 includes a display panel. The display panel may use a liquid crystal display (LCD), an organic light-emitting diode (OLED), an active-matrix organic light emitting diode (AMOLED), a flexible light-emitting diode (FLED), a mini LED, a micro LED, a micro OLED, a quantum dot light emitting diode (QLED), or the like. In some embodiments, the electronic device 100 may include one or N display screens 194, where N is a positive integer greater than 1.

The electronic device 100 may implement a photographing function by using the ISP, the camera 193, the video codec, the GPU, the display screen 194, the application processor, and the like.

The ISP is configured to process data fed back by the camera 193. For example, during photographing, a shutter is opened, light is transferred to a photosensitive element of the camera through a lens, an optical signal is converted into an electrical signal, and the photosensitive element of the camera transfers the electrical signal to the ISP for processing, so that the electrical signal is converted into an image visible to a naked eye. The ISP may further perform algorithm optimization on an image noise, luminance, and complexion. The ISP may further optimize parameters such as an exposure and a color temperature of a photographing scenario. In some embodiments, the ISP may be disposed in the camera 193.

The camera 193 is configured to capture a static image or a video. An optical image is generated for an object by using the lens and is projected onto the photosensitive element. The photosensitive element may be a charge coupled device (CCD) or a complementary metal-oxide-semiconductor (CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may further process another digital signal in addition to a digital image signal. For example, when the electronic device 100 performs frequency channel selection, the digital signal processor is configured to perform Fourier transformation and the like on frequency channel energy.

The video codec is configured to compress or decompress a digital video. The electronic device 100 can support one or more types of video codecs. In this way, the electronic device 100 can play or record videos in a plurality of encoding formats, for example, the moving picture experts group (MPEG)-1, MPEG-2, MPEG-3, and MPEG-4.

The NPU is a neural-network (NN) computing processor, and quickly processes input information by using a biological neural network structure, for example, by using a mode of transfer between human-brain neurons, and may further constantly perform auto-learning. The NPU may be used for implementing applications such as intelligent cognition of the electronic device 100, for example, image recognition, facial recognition, speech recognition, and text understanding.

The external memory interface 120 may be configured to connect to an external storage card (for example, a micro SD card), to extend a storage capability of the electronic device 100. The external storage card communicates with the processor 110 through the external memory interface 120, to implement a data storage function, for example, storing a file such as a music file or a video file in the external storage card.

The internal memory 121 may be configured to store computer executable program code, and the executable program code includes an instruction. The processor 110 runs the instruction stored in the internal memory 121, to implement various function applications and data processing of the electronic device 100. The internal memory 121 may include a program storage area and a data storage area. The program storage area may store an operating system, an application program required by at least one function (for example, a sound playback function and an image playback function), and the like. The data storage area may store data (such as audio data and a phone book) created during use of the electronic device 100, and the like. In addition, the internal memory 121 may include a high-speed random access memory, and may further include a non-volatile memory, for example, at least one magnetic disk storage device, a flash memory device, or a universal flash storage (UFS).

The electronic device 100 may use the audio module 170, the loudspeaker 170A, the telephone receiver 170B, the microphone 170C, the headset jack 170D, the application processor, and the like to implement an audio function, for example, music playback and sound recording.

The audio module 170 is configured to convert digital audio information into an analog audio signal output, and is also configured to convert an analog audio input into a digital audio signal. The audio module 170 may be further configured to encode and decode audio signals. In some embodiments, the audio module 170 may be disposed in the processor 110, or some of function modules in the audio module 170 are disposed in the processor 110.

The loudspeaker 170A, also referred to as a "speaker", is configured to convert an audio electrical signal into a sound signal. The electronic device 100 may be used for listening to music or listening to a hands-free call by using the loudspeaker 170A.

The telephone receiver 170B, also referred to as an "earpiece", is configured to convert an audio electrical signal into a sound signal. When a call is being answered or a voice message is being listened to by using the electronic device 100, the telephone receiver 170B may be placed close to a human ear to listen to a voice.

The microphone 170C is configured to convert a sound signal into an electrical signal. When making a call or sending a voice message, a user may make a sound with the mouth close to the microphone 170C, to input a sound signal to the microphone 170C. At least one microphone 170C may be configured for the electronic device 100. In some other embodiments, two microphones 170C may be configured for the electronic device 100, to collect a sound signal and further implement a noise reduction function. In some other embodiments, alternatively, three, four, or more microphones 170 C may be configured for the electronic device 100, to collect a sound signal, reduce noise, identify a sound source, implement a directional recording function, and the like.

The headset jack 170D is configured to connect to a wired headset. The headset jack 170D may be the USB interface 130, or may be a 3.5 mm open mobile terminal platform (OMTP) standard interface, a cellular telecommunications industry association (CTIA) standard interface, or the like.

The pressure sensor 180A is configured to sense a pressure signal, and can convert the pressure signal into an electrical signal. In some embodiments, the pressure sensor 180A may be disposed in the display screen 194. There are many types of pressure sensors 180A, for example, a resistive pressure sensor, an inductive pressure sensor, and a capacitive pressure sensor. The capacitive pressure sensor may include at least two parallel plates with conductive materials. When a force is applied to the pressure sensor 180A, capacitance between electrodes changes. The electronic device 100 determines pressure intensity based on a capacitance change. When a touch operation is performed on the display screen 194, the electronic device 100 detects strength of the touch operation by using the pressure sensor 180A. The electronic device 100 may also calculate a touch position based on a detection signal of the pressure sensor 180A. In some embodiments, touch operations that are applied to a same touch position but have different touch operation strength may correspond to different operation instructions. For example, when a touch operation whose touch operation strength is less than a first pressure threshold is applied to an SMS message application icon, an instruction for viewing an SMS message is executed; when a touch operation whose touch operation strength is greater than or equal to a first pressure threshold is applied to an SMS message application icon, an instruction for creating a new SMS message is executed.

The gyro sensor 180B may be configured to determine a motion posture of the electronic device 100. In some embodiments, an angular velocity of the electronic device 100 around three axes (namely, x, y, and z axes) may be determined by using the gyro sensor 180B. The gyro sensor 180B may be used for image stabilization during photographing. For example, when a shutter is pressed, the gyro sensor 180B detects a shaking angle of the electronic device 100, calculates, based on the angle, a distance for which a lens module needs to compensate, and allows the lens to cancel shaking of the electronic device 100 through reverse motion, to implement image stabilization. The gyro sensor 180B may also be used for navigation and a motion sensing game scenario.

The barometric pressure sensor 180C is configured to measure barometric pressure. In some embodiments, the electronic device 100 calculates an altitude by using a barometric pressure value obtained through measurement by the barometric pressure sensor 180C, to assist positioning and navigation.

The magnetic sensor 180D includes a Hall effect sensor. The electronic device 100 may detect opening and closing of a flip carrying case by using the magnetic sensor 180D. In some embodiments, when the electronic device 100 is a flip phone, the electronic device 100 may detect opening and closing of a flip cover by using the magnetic sensor 180D. Further, a feature such as flip-mode automatic unlocking is set based on a detected opening or closing state of the carrying case or a detected opening or closing state of the flip cover.

The acceleration sensor 180E may detect values of accelerations of the electronic device 100 in various directions (generally on three axes), may detect a value and direction of gravity when the electronic device 100 is static, and may be further configured to recognize a posture of the electronic device, and be applied to an application such as switching between landscape orientation and portrait orientation, or a pedometer.

The distance sensor 180F is configured to measure a distance. The electronic device 100 may measure a distance by using infrared or laser. In some embodiments, in a photographing scenario, the electronic device 100 may measure a distance by using the distance sensor 180F, to implement fast focusing.

The optical proximity sensor 180G may include, for example, a light emitting diode (LED) and an optical detector, such as a photodiode. The light emitting diode may be an infrared emitting diode. The electronic device 100 emits infrared light by using the light emitting diode. The electronic device 100 uses the photodiode to detect reflected infrared light from a nearby object. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear to make or answer a call, thereby automatically turning off the screen to save power. The optical proximity sensor 180G may also be used for carrying-case-mode or pocket-mode automatic unlocking and screen locking.

The ambient light sensor 180L is configured to sense an ambient light intensity. The electronic device 100 may adaptively adjust brightness of the display screen 194 based on the sensed ambient light intensity. The ambient light sensor 180L may also be configured to automatically adjust white balance during photographing. The ambient light sensor 180L may further cooperate with the optical proximity sensor 180G in detecting whether the electronic device 100 is in a pocket, to prevent an accidental touch.

The fingerprint sensor 180H is configured to collect a fingerprint. The electronic device 100 may use a collected fingerprint feature to implement fingerprint unlock, application access lock, fingerprint-based photographing, fingerprint-based call answering, and the like.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 lowers performance of a processor close to the temperature sensor 180J, to reduce power consumption and implement thermal protection. In some other embodiments, when the temperature is less than another threshold, the electronic device 100 heats the battery 142 to prevent the low temperature from causing the electronic device 100 to shut down abnormally. In some other embodiments, when the temperature is less than still another threshold, the electronic device 100 boosts an output voltage of the battery 142 to prevent abnormal shutdown caused by the low temperature.

The touch sensor 180K is also referred to as a "touch panel". The touch sensor 180K may be disposed in the display screen 194, and the touch sensor 180K and the display screen 194 constitute a touchscreen, also referred to as a "touch control screen". The touch sensor 180K is configured to detect a touch operation on or near the touch sensor 180K. The touch sensor may transfer the detected touch operation to the application processor to determine a touch event type. A visual output related to the touch operation may be provided by using the display screen 194. In some other embodiments, the touch sensor 180K may be alternatively disposed on a surface of the electronic device 100, at a position different from that of the display screen 194.

The bone conduction sensor 180M may obtain a vibration signal. In some embodiments, the bone conduction sensor 180M may obtain a vibration signal of a human vocal-part vibration bone. The bone conduction sensor 180M may also come into contact with a body pulse to receive a blood pressure beating signal. In some embodiments, the bone conduction sensor 180M may be alternatively disposed in a headset, so that the bone conduction sensor 180M and the headset are combined into a bone conduction headset. The audio module 170 may obtain a voice signal through parsing based on the vibration signal, of the vocal-part vibration bone, obtained by the bone conduction sensor 180M, so as to implement a voice function. The application processor may parse heart rate information based on the blood pressure beating signal obtained by the bone conduction sensor 180M, so as to implement a heart rate detection function.

The key 190 may include a power key, a volume key, and the like. The key 190 may be a mechanical key, or may be a touch key. The electronic device 100 may receive a key input, and generate a key signal input related to a user setting and function control of the electronic device 100.

The motor 191 may generate a vibration prompt. The motor 191 may be used for an incoming call vibration prompt, and may also be used for a touch vibration feedback. For example, touch operations performed on different applications (such as photographing and audio playback) may correspond to different vibration feedback effects. For touch operations performed on different areas of the display screen 194, the motor 191 may also correspond to different vibration feedback effects. Different application scenarios (for example, a time reminder, information reception, an alarm clock, and a game) may also correspond to different vibration feedback effects. A touch vibration feedback effect can also be user-defined.

The indicator 192 may be an indicator light, and may be configured to indicate a charging status and a battery level change, or may be configured to indicate a message, a missed call, a notification, and the like.

The SIM card interface 195 is configured to connect to a SIM card. The SIM card may be inserted into the SIM card interface 195 or removed from the SIM card interface 195, to come into contact with or be separated from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into the same SIM card interface 195 at the same time. The plurality of cards may be of a same type or different types. The SIM card interface 195 may also be compatible with different types of SIM cards. The SIM card interface 195 may also be compatible with an external storage card. The electronic device 100 interacts with a network by using a SIM card, to implement a call function, a data communication function, and the like. In some embodiments, the electronic device 100 uses an eSIM, namely, an embedded SIM card. The eSIM card may be embedded in the electronic device 100 and cannot be separated from the electronic device 100.

It can be understood that the structure shown in FIG. 1 in this embodiment of this application does not constitute a specific limitation on the electronic device 100. In some other embodiments of this application, the electronic device 100 may include more or fewer components than those shown in the figure, or combine some components, or split some components, or have a different component arrangement. The components shown in the figure may be implemented by hardware, software, or a combination of software and hardware.

The following describes the embodiments of this application in detail by using the electronic device 100 as an example.

In addition, it should be understood that an application program supported by the electronic device in the embodiments of this application may include a photographing application, for example, a camera. In addition, the application program supported by the electronic device may further include a plurality of other applications, for example, drawing, a game, a phone, a video player, a music player, photo management, a browser, a calendar, and a clock.

Figure 2:
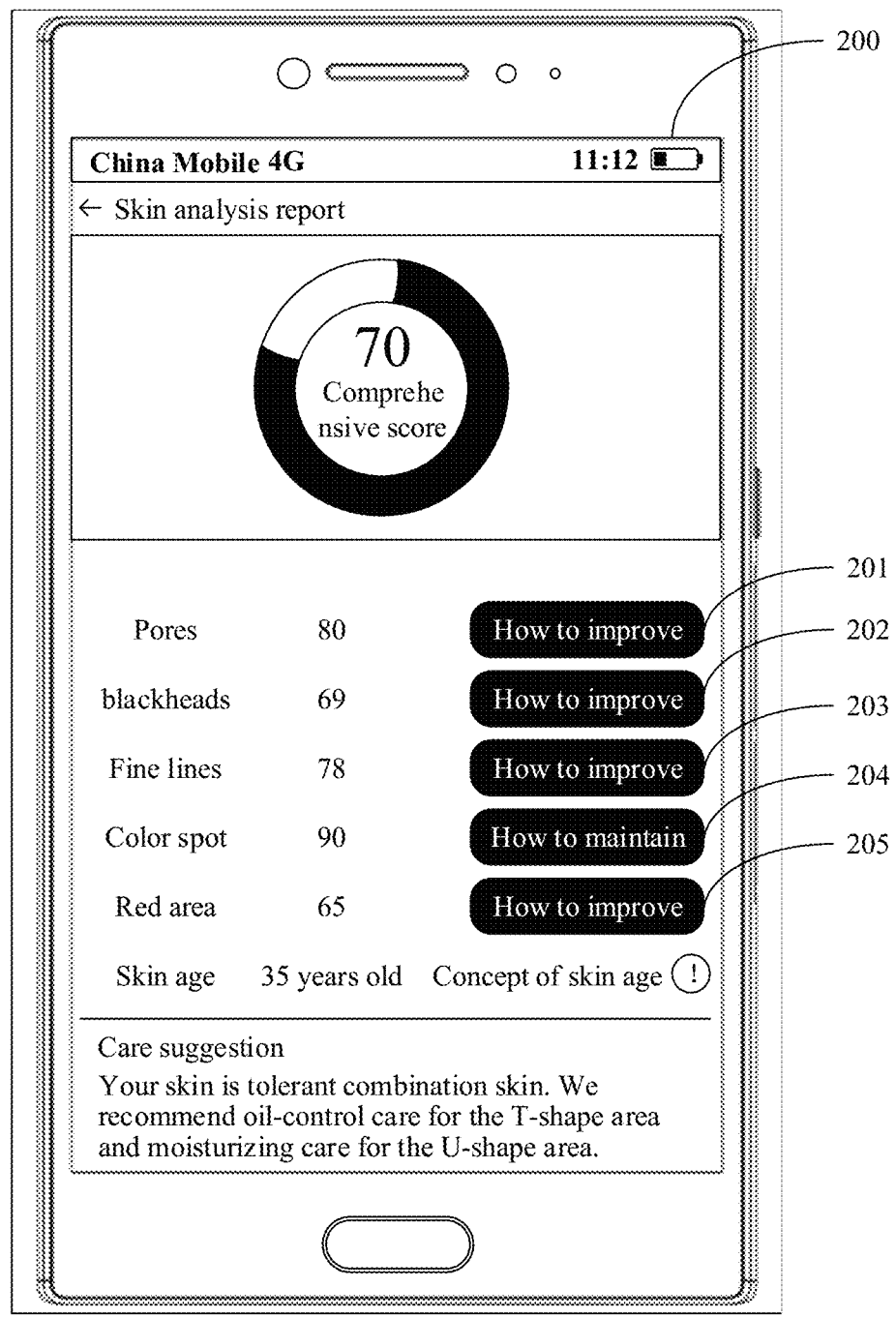
FIG. 2 is a schematic diagram of a user interface according to an embodiment of this application.

An application supported by the electronic device in the embodiments of this application may further include an application used for skin detection. The application used for skin detection detects a facial skin feature (for example, a wrinkle, a pore, a blackhead, a color spot, or a red area of facial skin) of a user by using a photographed face image, and can provide a detection result report for the user. For example, the detection result report may include but is not limited to a score of each feature on the facial skin, comprehensive analysis of the facial skin, and the like, and may further present the face image of the user, and mark a corresponding problem on the face image based on a detection result of each feature, for example, mark a blackhead in a nose area, mark a wrinkle in a forehead area, and mark a color spot in a cheek area. It can be understood that the detection result report may be presented to the user by using a user interface. For example, the detection result report may include, as shown by a user interface 200 shown in FIG. 2, a comprehensive score, a skin age, and scores of a pore, a blackhead, a fine line, a color spot, and a red area. In some other embodiments, the user interface 200 may further include a virtual button 201, a virtual button 202, a virtual button 203, a virtual button 204, and a virtual button 205. The virtual button 201 is used as an example. The electronic device 100 displays, on the display screen 194, a specific care suggestion for pores in response to an operation on the virtual button 201. For functions of the virtual button 202, the virtual button 203, the virtual button 204, and the virtual button 205, refer to the function of the virtual button 201. Details are not described herein again.

To improve accuracy of user facial skin detection performed by the electronic device, for example, in a user skin detection solution in the embodiments of this application, a photographing condition detection module, an image quality detection module, a region of interest (ROI) detection module, a skin feature detection module, a result analysis module, and the like may be integrated into the processor 110. In some embodiments, a photographing condition detection module, an image quality detection module, a region of interest (ROI) detection module, a skin feature detection module, a result analysis module, and the like may be integrated into the application processor in the processor 110. In some other embodiments, an artificial intelligence (AI) chip is integrated into the processor 110, and a photographing condition detection module, an image quality detection module, a region of interest (region of interest, ROI) detection module, a skin feature detection module, a result analysis module, and the like are integrated into the AI chip, to implement user skin detection.

The photographing condition detection module may detect a current photographing condition, to instruct the user to perform photographing under a required photographing condition, thereby ensuring that a photographed image meets a requirement. This ensures accuracy of image-based skin detection. For example, the required photographing condition includes: sufficient ambient light, a proper distance (for example, about 25 cm) between a face and the electronic device, the face being upright, an eye being opened and closed, no glasses being worn, as little hair blocking a forehead as possible, accurate focusing, no obvious shaking, and the like.

After the photographing condition detection module succeeds in detection, the processor 110 enables intelligent light compensation. For example, when the current photographing condition meets the requirement, the photographing condition detection module determines that detection succeeds. Specifically, the electronic device in the embodiments of this application may use different light compensation modes (for example, a camera flash mode and a flashlight mode) to supplement light on the face of the user, so as to meet detection requirements of different facial skin features. After light compensation is performed on the face of the user, the processor 110 may control the camera 193 to photograph the face of the user to obtain a face image of the face of the user.

The image quality detection module may detect face image quality, to ensure that the photographed image meets detection requirements of different facial skin features.

After the image quality detection module detects that the image quality meets a requirement, the ROI detection module may determine a to-be-detected ROI from the face image. For example, a blackhead ROI is a small area on a nose.

The skin feature detection module may detect each facial skin feature in the determined ROI, for example, detect a wrinkle, a pore, a blackhead, a color spot, a red area, and an oiliness degree of skin.

The result analysis module may analyze a detection result of the facial skin feature obtained through detection by the skin feature detection module, and provide a score, a score ranking, and the like of each detection item for each skin feature.

In addition, in some embodiments, the processor 110 may further integrate an image preprocessing module. The image preprocessing module may perform compression, cropping, and the like on the photographed face image, so that the ROI detection module, the skin feature detection module, and the like perform subsequent processing.

To output a face image analysis result, output a score of each detection item, or the like, the processor 110 may further display, on the display screen 194, a detection report (including an area in which a detection result of each feature is located on the face image, for example, a blackhead is marked in a nose area, a wrinkle is marked in a forehead area, and a color spot or the like is marked in a cheek area, and scores of all detection items) obtained through detection, thereby improving user experience.

Considering that ambient light is an important factor that affects photographing quality, in the embodiments of this application, to improve photographing quality, the electronic device may automatically photograph, when the ambient light meets the photographing condition, an image collected by the camera. It should be noted that automatic photographing of an image collected by the camera in the embodiments of this application means that the electronic device can photograph, without any operation (for example, a photographing button operation, a voice instruction, or a photographing gesture) performed by the user, the image collected by the camera.

It should be noted that, in the embodiments of this application, that the electronic device may automatically photograph, when the ambient light meets the photographing condition, an image collected by the camera may be that the electronic device may automatically photograph, only when the ambient light meets the photographing condition, the image collected by the camera; or may be that the electronic device automatically photographs, when the ambient light meets the photographing condition and another preset condition (for example, the user closes an eye) is also met, the image collected by the camera.

For example, the embodiments of this application may be applied to a first application, and the first application may be an application having a photographing function, for example, a camera application or a skin detection application. It should be further noted that the first application in the embodiments of this application may be an application pre-installed on the electronic device 100 before delivery, or may be a third-party application downloaded by the user from an application market.

Figure 3A:
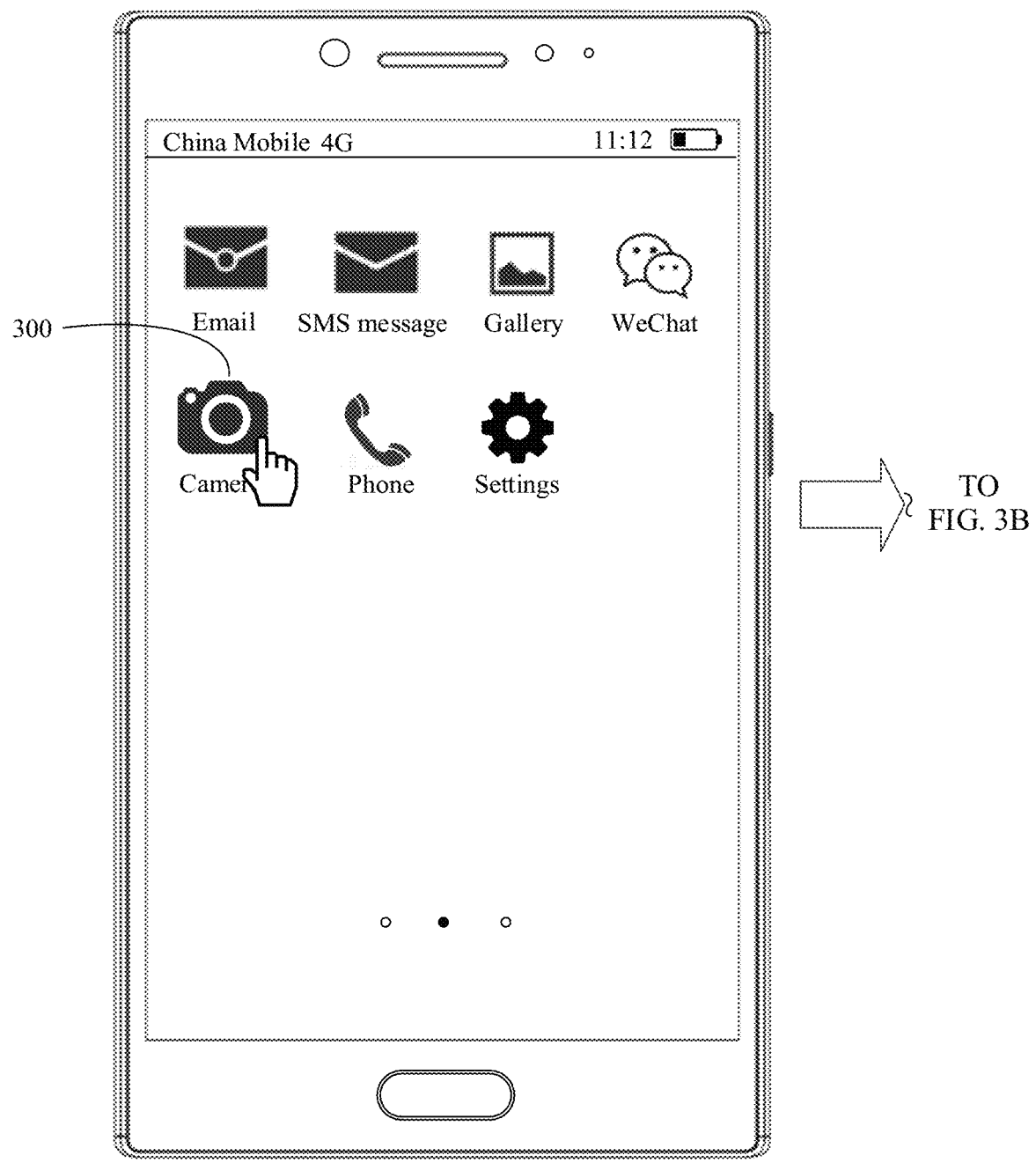
FIG. 3A and FIG. 3B is a schematic diagram of an application scenario according to an embodiment of this application.
Figure 3B:
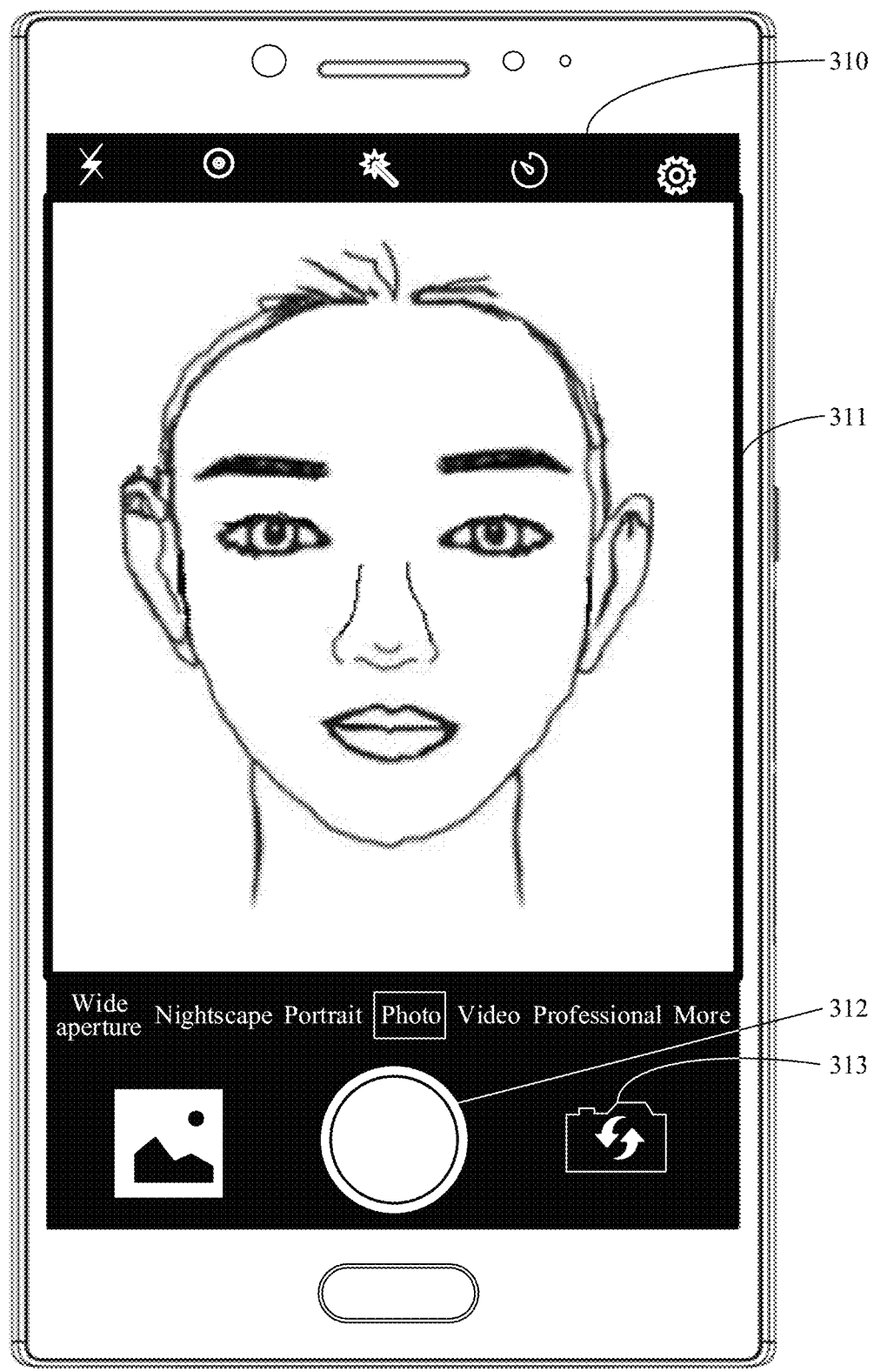

That the first application is a camera application is used as an example. For example, as shown in FIG. 3A and FIG. 3B, the display screen 194 of the electronic device 100 displays an icon 300 of the camera application, and the display screen 194 displays a photographing preview interface 310 in response to an operation on the icon 300. The photographing preview interface 310 may be used to display an image collected by the camera 193. For example, the operation on the icon 300 may be a touch operation on the icon 300, or may be another operation.

In some embodiments, the photographing preview interface 310 may include a preview area 311, and the preview area 311 is used to display the image collected by the camera 193. For example, the image collected by the camera 193 may be a face image, may be a landscape image, or may be another image. It should be noted that the camera 193 may be a front-facing camera of the electronic device 100, or may be a rear-facing camera of the electronic device 100. The user may switch between the front-facing camera and the rear-facing camera by performing an operation on a virtual button 313, or may switch between the front-facing camera and the rear-facing camera in another manner.

When the display screen 194 displays the photographing preview interface 310, the image collected by the camera 193 may be photographed in response to an operation of the user on a virtual button 312. To obtain a high-quality photo, the electronic device 100 may automatically photograph, when ambient light meets the photographing condition, the image collected by the camera 193. In some embodiments, when ambient light does not meet the photographing condition, the electronic device 100 notifies the user that the current ambient light is insufficient. This helps the user understand a reason why the electronic device 100 currently cannot perform automatic photographing. For example, the electronic device 100 may notify, by using a voice, the user that the current ambient light is insufficient, or may display prompt information by using the display screen 194, where the prompt information is used to notify the user that the current ambient light is insufficient. Alternatively, the electronic device 100 may notify the user that the current ambient light is insufficient by using a combination of a voice prompt and prompt information displayed on the display screen 194.

Figure 4:
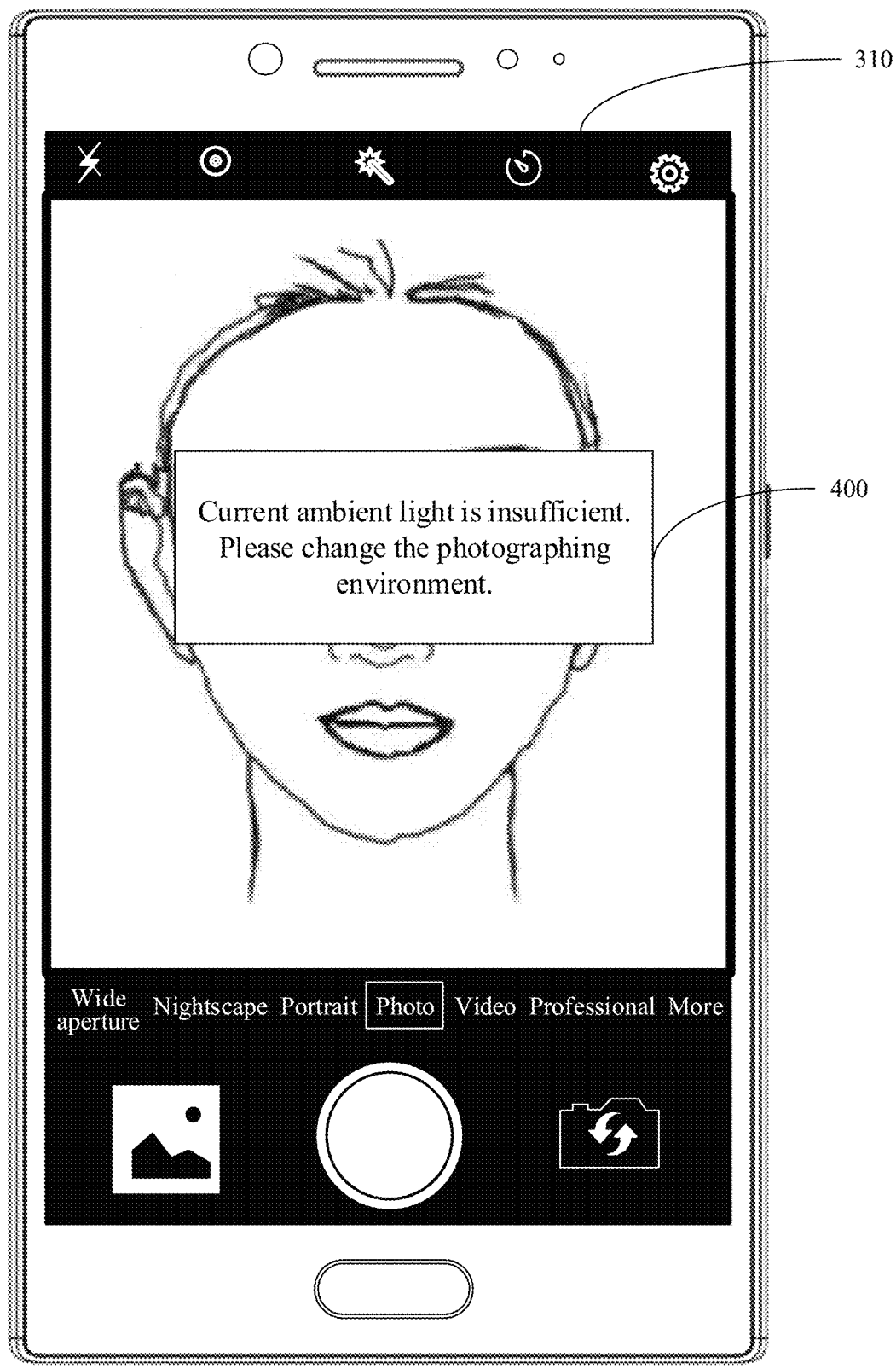
FIG. 4 is a schematic diagram of prompt information according to an embodiment of this application.

For example, as shown in FIG. 4, the display screen 194 of the electronic device 100 displays a prompt box 400, where the prompt box 400 includes prompt information, and the prompt information is used to notify the user that current ambient light is insufficient and a photographing environment needs to be changed.

To help the user understand a function of automatic photographing that is based on ambient light, in some embodiments, a virtual button used to control enabling or disabling of the function of automatic photographing that is based on ambient light may be added to a setting interface of the camera application. It should be noted that the setting interface of the camera application may be a setting interface belonging to the camera application, or may be a setting interface for the camera application in a system setting interface.

Figure 5A:
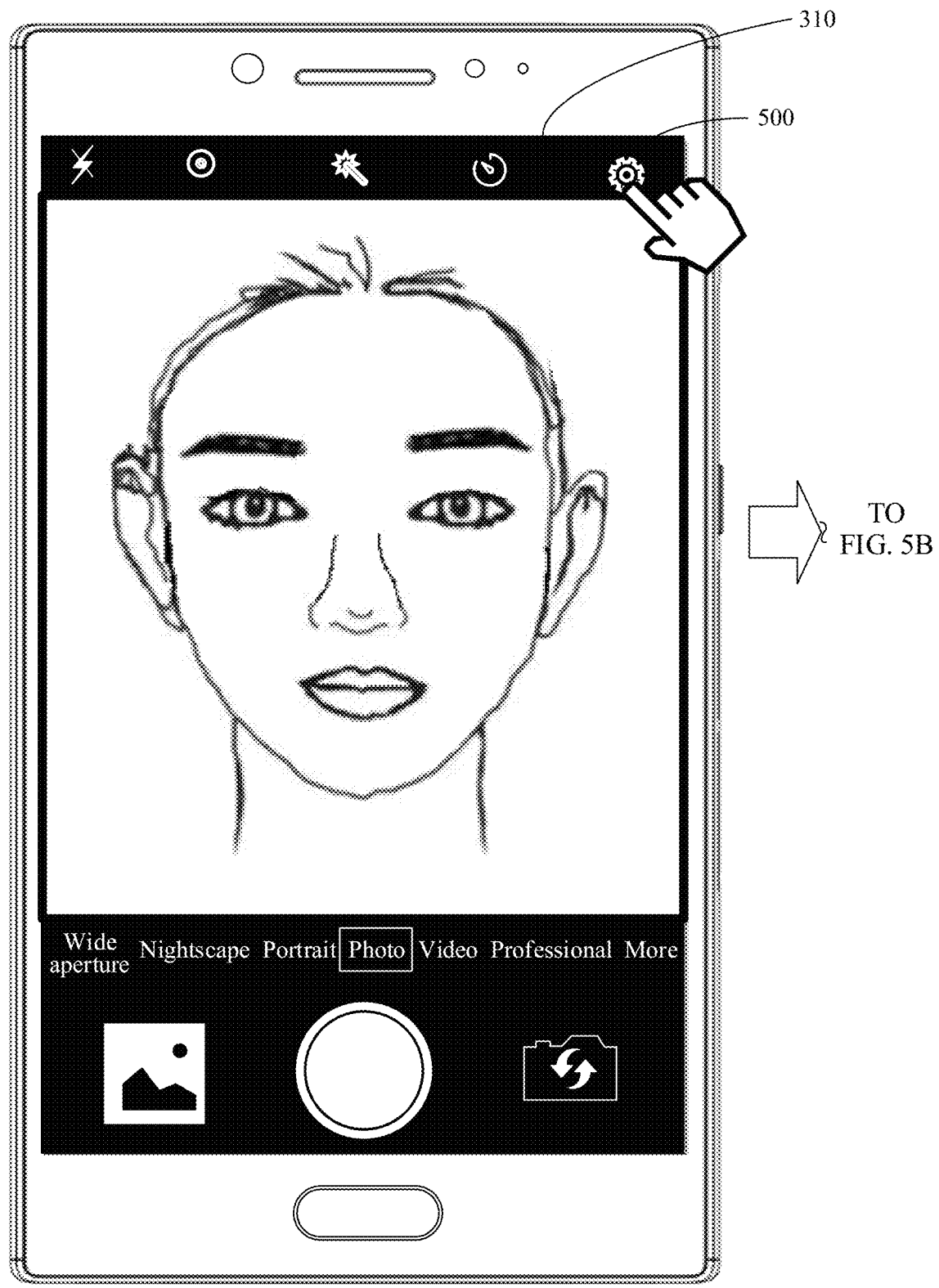
FIG. 5A and FIG. 5B is a schematic diagram of a setting interface of a camera application according to an embodiment of this application.
Figure 5B:
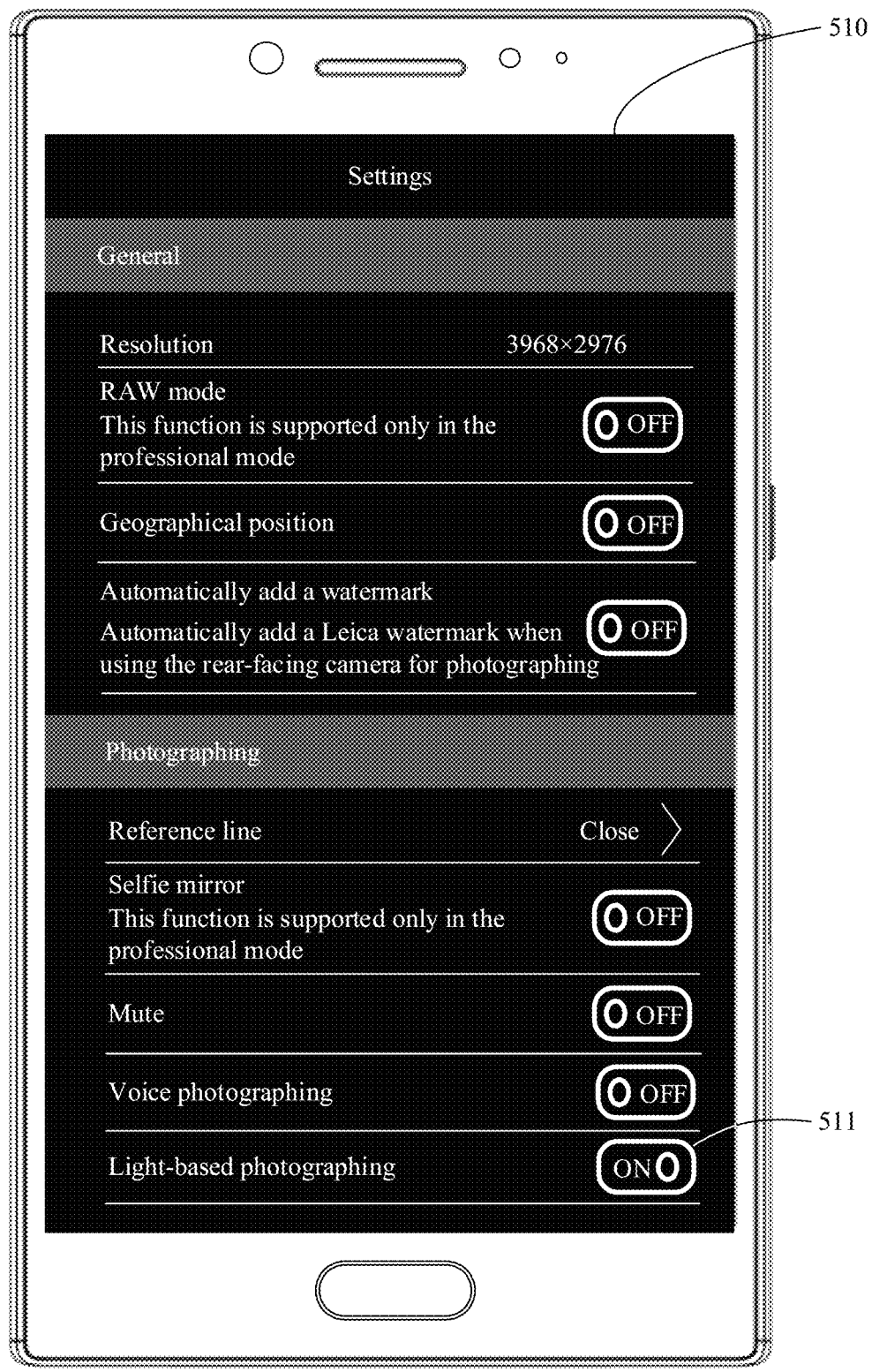
Figure 6A:
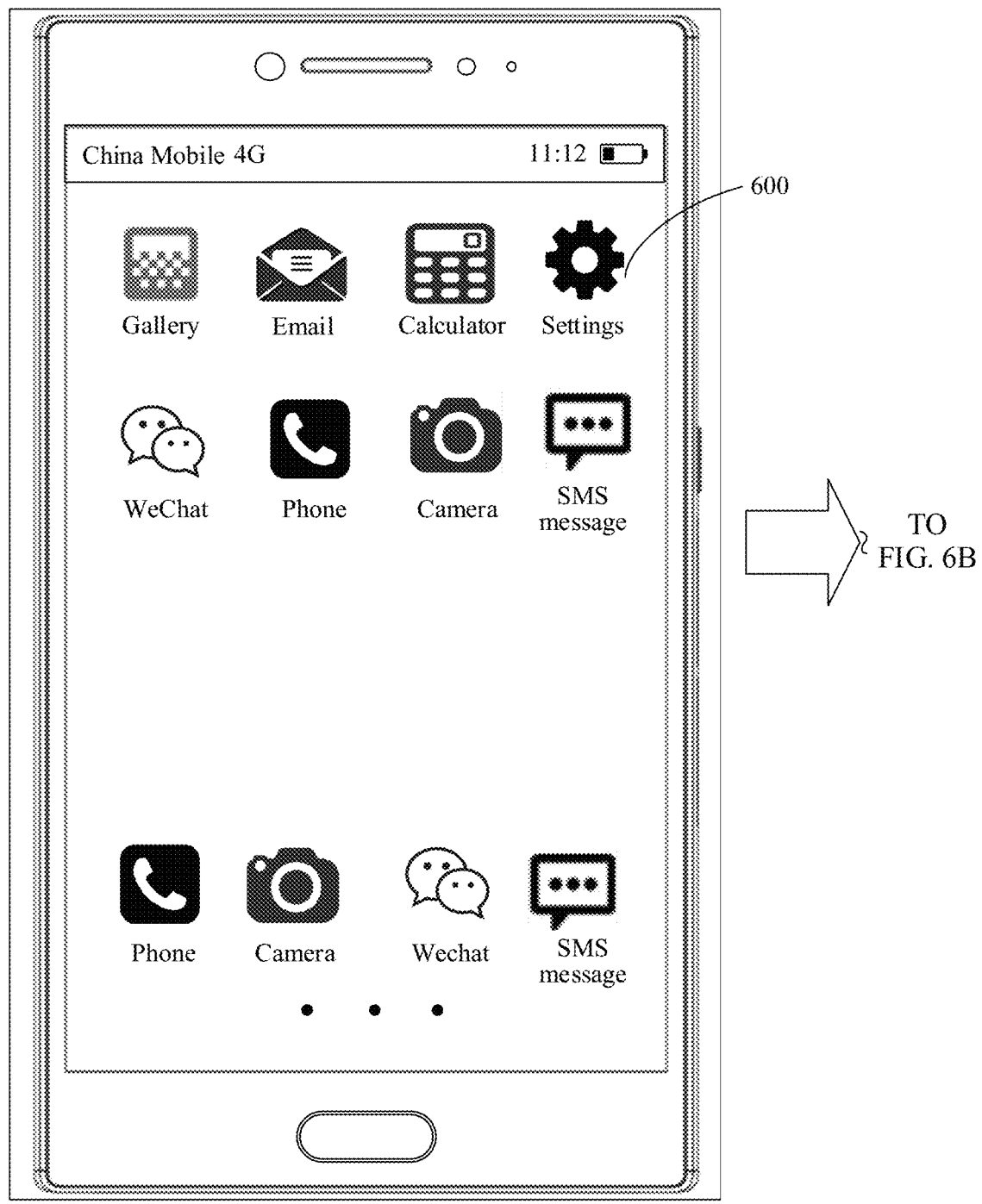
FIG. 6A to FIG. 6D is a schematic diagram of another setting interface of a camera application according to an embodiment of this application.
Figure 6B:
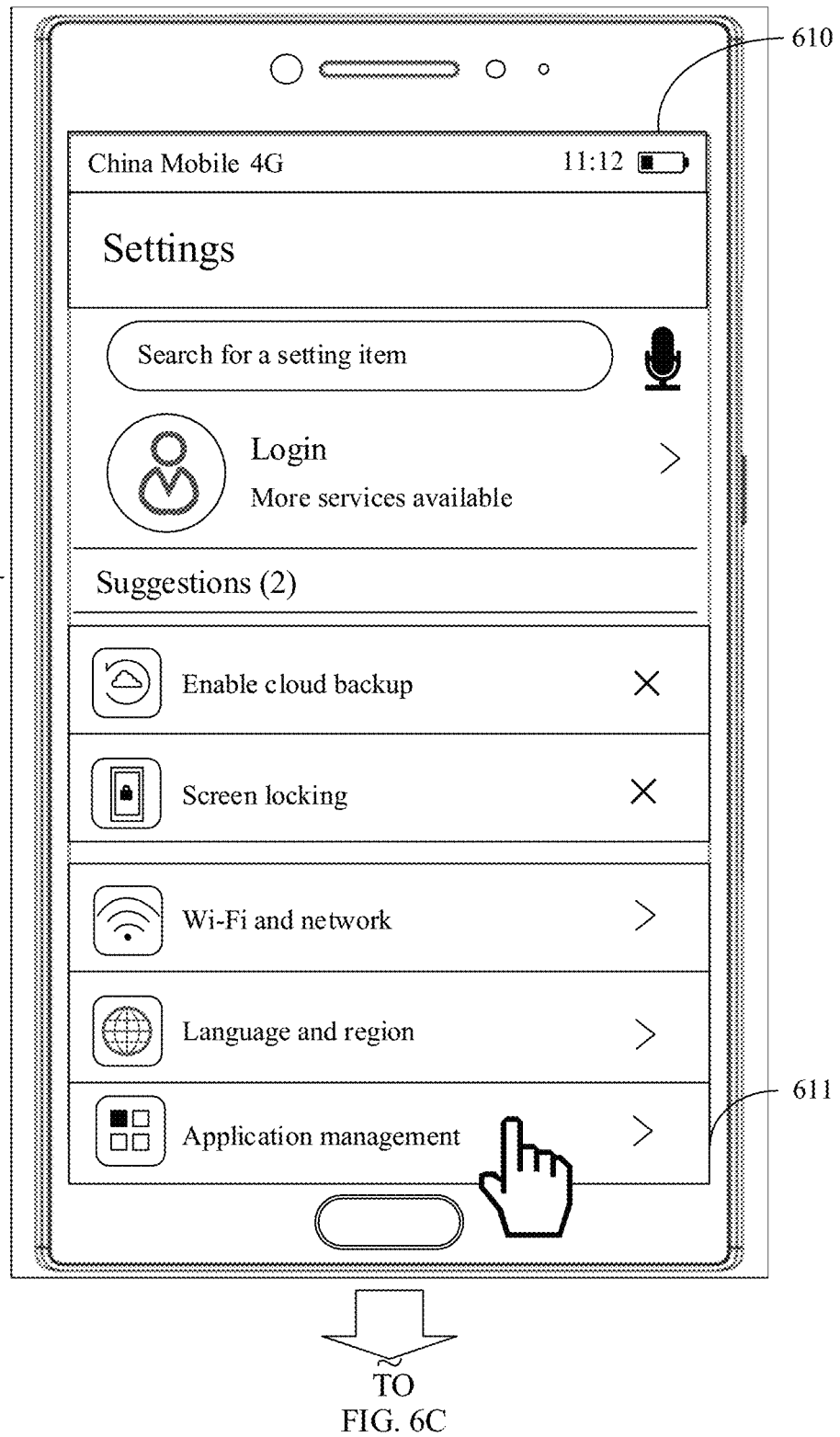
Figure 6C:
Figure 6D:
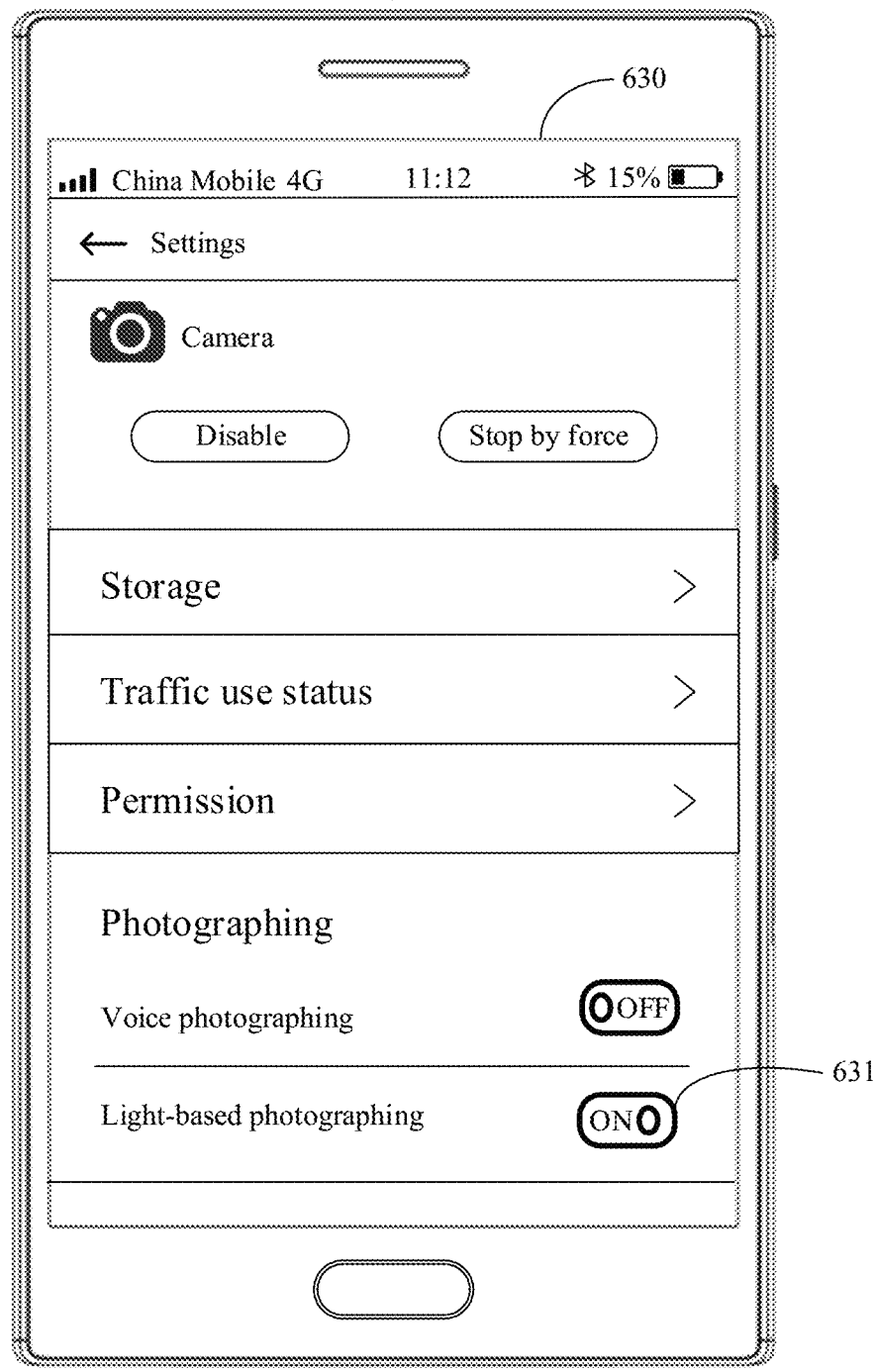

For example, as shown in FIG. 5A and FIG. 5B, the electronic device 100 may display a setting interface 510 of the camera application on the display screen 194 in response to an operation on a setting button 500 in the photographing preview interface 310. The setting interface 510 of the application includes some virtual buttons used to set a photographing function, for example, a resolution and a selfie mirror. It should be noted that the electronic device 100 may also display the setting interface 510 of the camera application on the display screen 194 in response to another operation (for example, sliding rightward or sliding leftward). To help the user understand the function of automatic photographing that is based on ambient light, a virtual button 511 used to control light-based photographing is added to the setting interface 510 of the application. When the virtual button 511 is on, and the electronic device 100 displays the photographing preview interface, if ambient light meets the photographing condition, the electronic device 100 automatically photographs the image collected by the camera 193. When the virtual button 511 is off, if the electronic device 100 photographs the image collected by the camera 193, the electronic device 100 may no longer detect whether ambient light meets the photographing condition.

For another example, as shown in FIG. 6A to FIG. 6D, the electronic device 100 may display a system setting interface 610 on the display screen 194 in response to an operation on a setting icon 600. The electronic device 100 may display a user interface 620 on the display screen 194 in response to an operation on application management 611 included in the system setting interface 610. The user interface 620 includes an icon of an application, for example, a gallery, an email, a camera, and settings, installed on the electronic device 100. The electronic device 100 may display a setting interface 630 of the camera application on the display screen 194 in response to an operation of the user on an icon 621 of the camera application. To help the user understand the function of automatic photographing that is based on ambient light, a virtual button 631 used to control light-based photographing is added to the setting interface 630 of the application. For a function of the virtual button 631, refer to the function of the virtual button 511. Details are not described herein again.

It should be noted that, in the embodiments of this application, in response to an operation of the user, the electronic device 100 may invoke, by using the first application, the camera to collect an image, so as to display the photographing preview interface. Alternatively, in response to an operation of the user, the electronic device 100 may invoke a second application by using the first application, to invoke the camera to collect an image, so as to display the photographing preview interface.

Figure 7A:
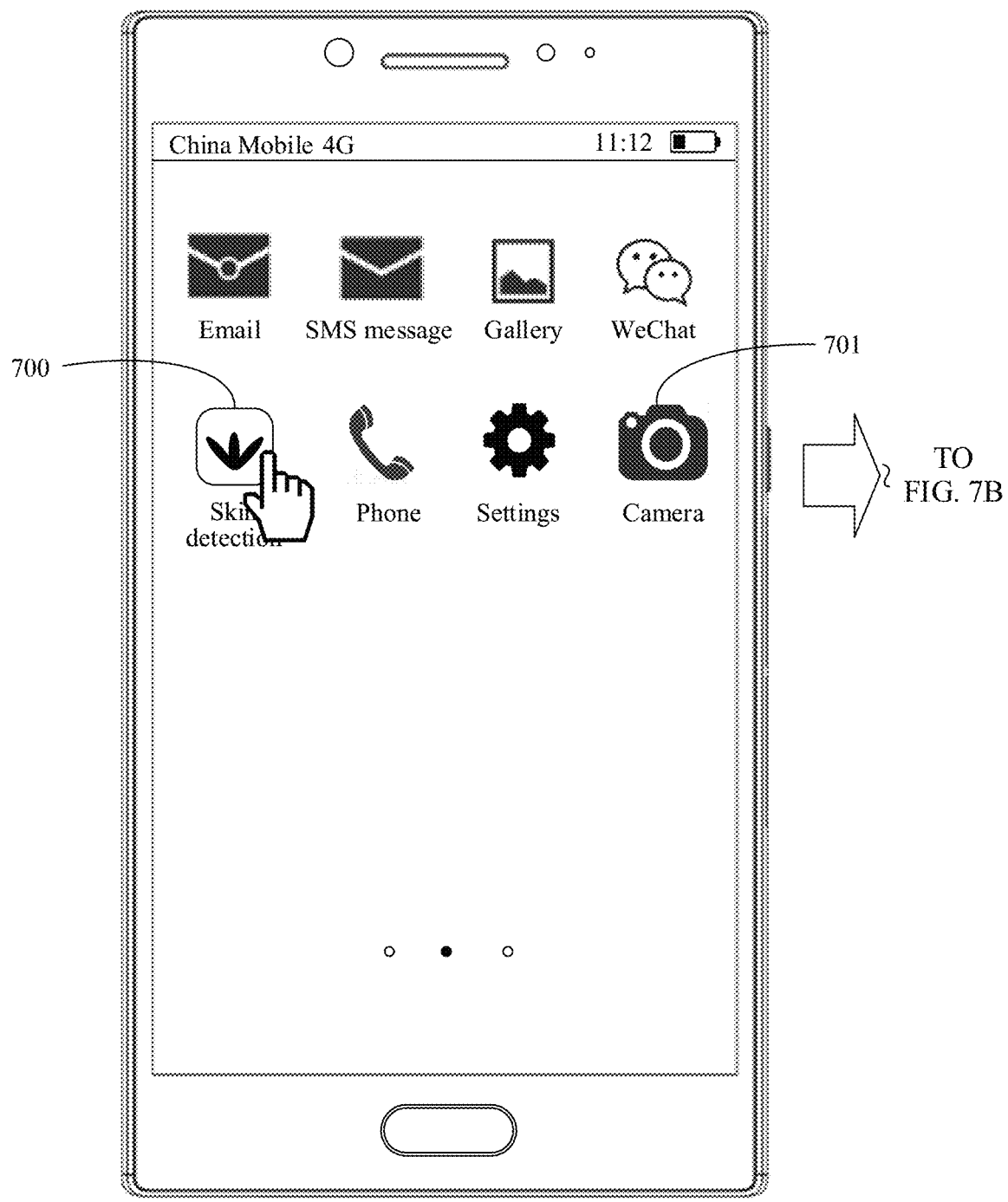
FIG. 7A to FIG. 7C is a schematic diagram of another application scenario according to an embodiment of this application.
Figure 7B:
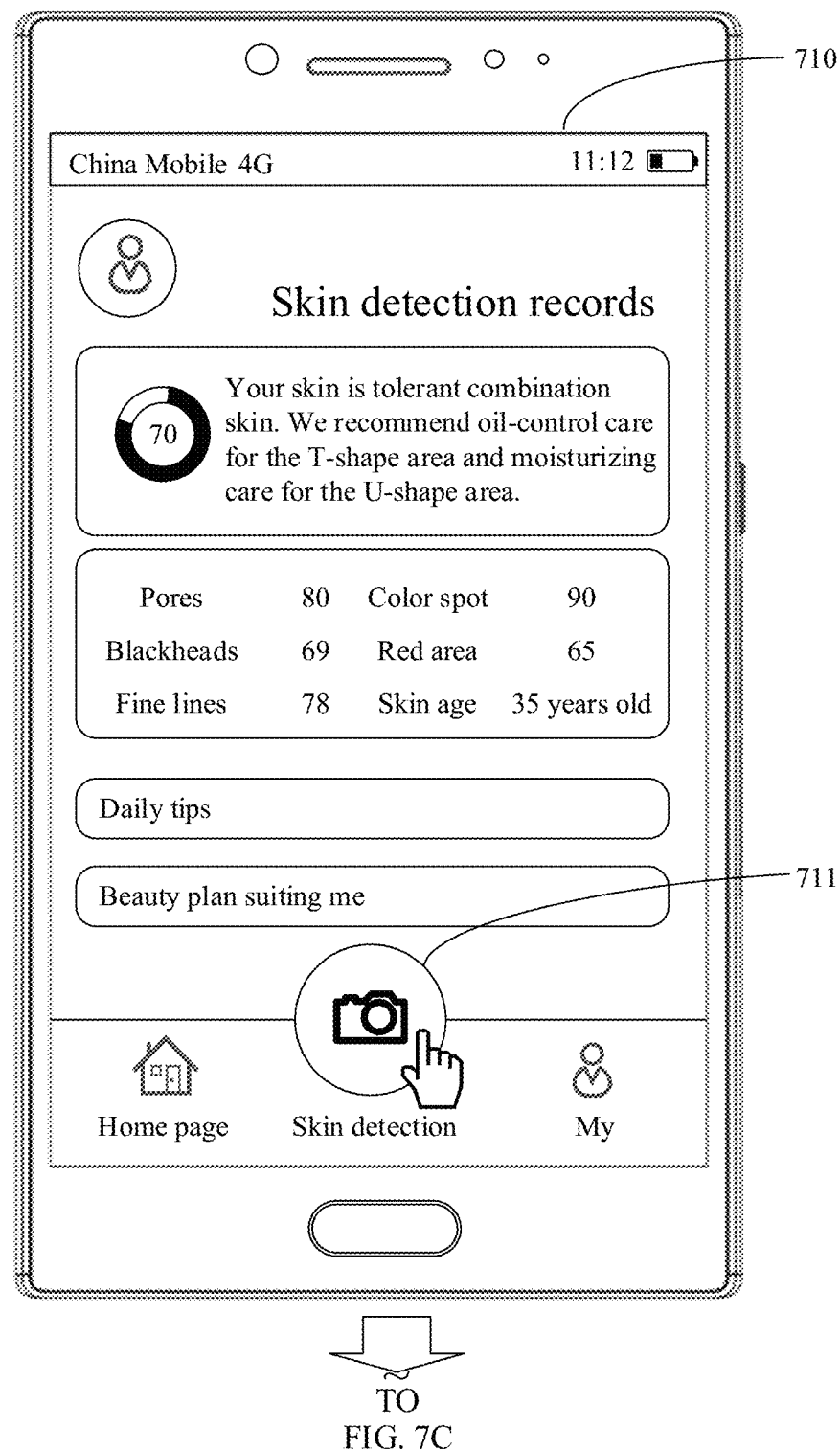
Figure 7C:
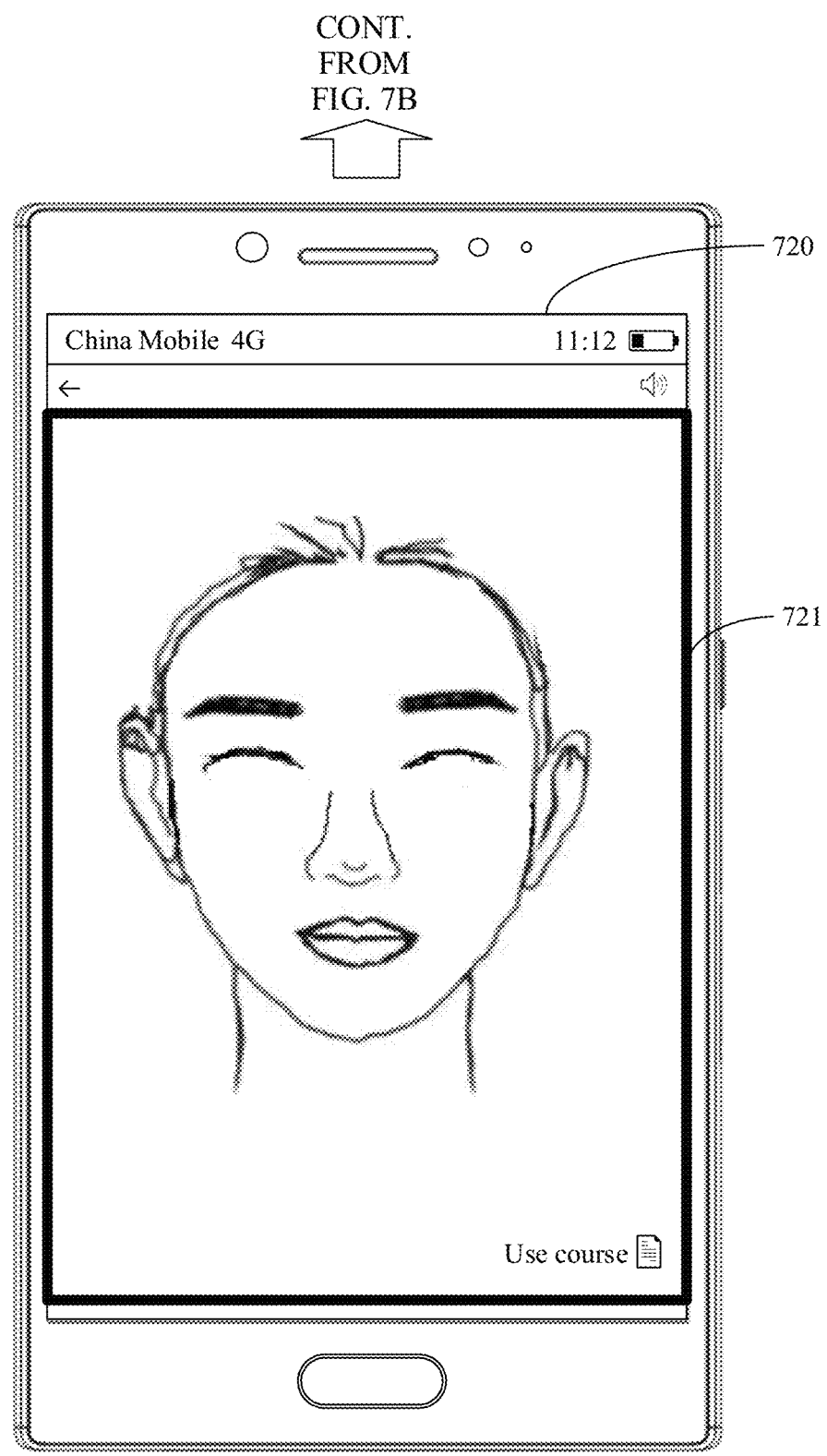

The following provides descriptions by using an example in which the first application is an application used for skin detection and the second application is a camera. For example, as shown in FIG. 7A to FIG. 7C, the display screen 194 of the electronic device 100 displays an icon 700 of the skin detection application. When detecting an operation on the icon 700, the electronic device 100 displays a user interface 710 of the skin detection application on the display screen 194 in response to the operation on the icon 700. The user interface 710 of the skin detection application includes a skin detection button 711. The electronic device 100 detects an operation on the skin detection button 711. In response to the operation on the skin detection button 711, the display screen 194 displays a photographing preview interface 720 of the camera application. The photographing preview interface 720 is used to display an image collected by the camera 193. For example, the photographing preview interface 720 may include a preview area 721, and the preview area 721 is used to display the image collected by the camera 193. It should be understood that the image collected by the camera 193 may be a face image of the user. In addition, the camera 193 may be a front-facing camera of the electronic device 100, or may be a rear-facing camera of the electronic device 100. In some embodiments, to improve photographing quality, when a pixel of the front-facing camera is lower than a pixel of the rear-facing camera, the camera 193 is the rear-facing camera of the electronic device 100. To further improve photographing quality, when determining that ambient light meets the photographing condition, the electronic device 100 automatically photographs the image collected by the camera 193. It should be noted that the skin detection button 711 in this embodiment of this application may also be referred to as a photographing button. A name of the skin detection button 711 is not limited in this embodiment of this application.

In this embodiment, to improve reliability of evaluating the ambient light by the electronic device 100, the ambient light may be evaluated by using a combination of software and hardware.

In some embodiments, when the display screen 194 displays the photographing preview interface, the electronic device 100 may obtain an ambient light intensity from the ambient light sensor 180L. When the ambient light intensity is less than a first threshold, an average grayscale value of an ROI image is obtained from the photographing preview interface. If the average grayscale value is greater than a second threshold, the electronic device 100 automatically photographs the image collected by the camera 193.

Figure 8:
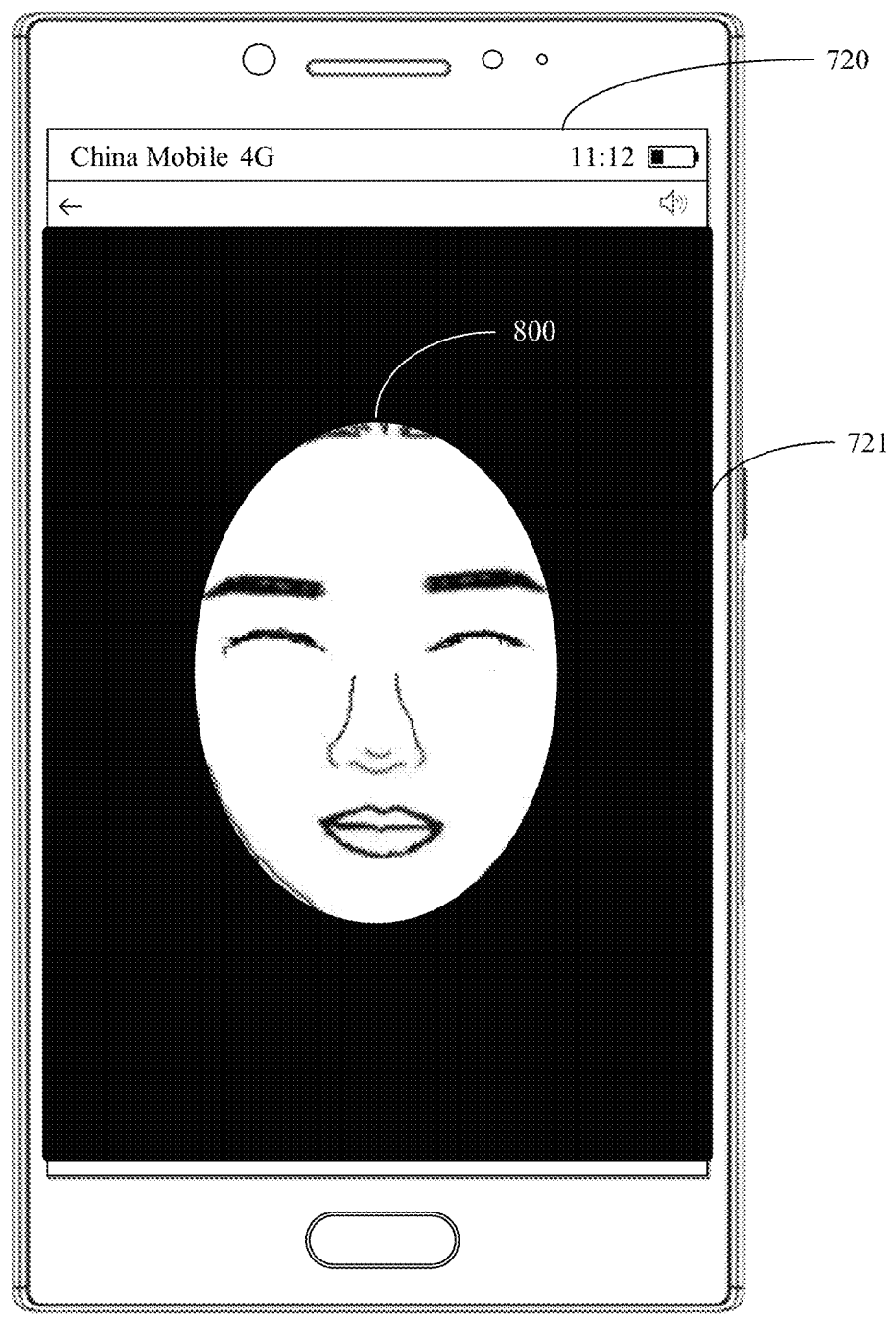
FIG. 8 is a schematic diagram of an ROI according to an embodiment of this application.

The photographing preview interface 720 shown in FIG. 7 is used as an example. The photographing preview interface 720 includes the preview area 721. The preview area 721 is used to display a complete image collected by the camera 193. An ROI may be equal to the preview area 721 in size, or may be smaller than the preview area 721. For example, as shown in FIG. 8, an ROI is an area 800. It should be noted that, when the ROI is smaller than the preview area 721, the electronic device 100 may determine the ROI from the photographing preview interface based on a preset algorithm. In addition, in this embodiment of this application, the average grayscale value of the ROI image may be determined based on an existing algorithm of an average grayscale value of an image, or may be determined based on another algorithm.

The first threshold in this embodiment may be preset in the electronic device 100, or an algorithm for determining the first threshold may be preset in the electronic device 100. The first threshold may be set based on an actual situation or experimental data. For example, when the ambient light intensity is greater than or equal to 10 lux, the ambient light is sufficient; when the ambient light intensity is less than 10 lux, the ambient light is insufficient. In this case, the first threshold may be set to 10 lux.

In this embodiment, when the ambient light intensity is less than the first threshold, the average grayscale value of the ROI image is further determined. Compared with evaluating the ambient light by using only the ambient light intensity, this helps avoid a problem of inaccurate ambient light evaluation resulting from an inaccurate ambient light intensity obtained by the electronic device 100 due to a case in which the ambient light sensor 180L is blocked or the like.

In this embodiment of this application, the second threshold may be preset in the electronic device 100, or an algorithm for determining the second threshold may be preset in the electronic device 100.

Different luminous fluxes are related to ambient light. For example, when a luminous flux is comparatively large, ambient light is comparatively dark; when a luminous flux is comparatively small, ambient light is comparatively bright. To improve accuracy of ambient light evaluation performed based on the average grayscale value of the ROI image, in some embodiments, a correspondence table between a luminous flux and a threshold may be preconfigured in the electronic device 100. A larger luminous flux corresponds to a larger threshold, and a smaller luminous flux corresponds to a smaller threshold. The second threshold is a threshold corresponding to a first luminous flux, and the first luminous flux is a luminous flux determined by the electronic device 100 when the display screen 194 displays the photographing preview interface. Specifically, the electronic device 100 determines the first luminous flux in response to a photographing operation (for example, an operation on a photographing button or an operation on an icon of a camera application); then the camera 193 collects an image based on the first luminous flux, and the image is displayed on the display screen 194.

It should be understood that, in this embodiment, different thresholds may be set for different luminous fluxes, or different luminous fluxes may be divided into segments, that is, different luminous flux ranges correspond to different thresholds. Specifically, different luminous fluxes may be divided into N luminous flux ranges. Each of the N luminous flux ranges corresponds to one threshold, and the N luminous flux ranges correspond to different thresholds. A value of N may be set based on an actual requirement. For example, different luminous fluxes may be divided into a luminous flux range 1 and a luminous flux range 2, where the luminous flux range 1 corresponds to a threshold 1, and the luminous flux range 2 corresponds to a threshold 2. For example, if a minimum value in the luminous flux range 1 is greater than a maximum value in the luminous flux range 2, the threshold 1 is greater than the threshold 2. For another example, different luminous fluxes may be alternatively divided into a luminous flux range 1, a luminous flux range 2, a luminous flux range 3, and a luminous flux range 4. The luminous flux range 1 corresponds to a threshold 1, the luminous flux range 2 corresponds to a threshold 2, the luminous flux range 3 corresponds to a threshold 3, and the luminous flux range 4 corresponds to a threshold 4.

In this embodiment, to simplify an implementation, in some embodiments, the electronic device 100 may determine the first luminous flux based on a first light sensitivity (ISO) and a first exposure time. The first ISO is an ISO determined by the electronic device 100 when the display screen 194 displays the photographing preview interface, and the first exposure time is an exposure time determined by the electronic device 100 when the display screen 194 displays the photographing preview interface. For example, different ISOs and different exposure times may be preset in the electronic device 100. Then, when the camera 193 needs to collect an image, the electronic device 100 may determine the first ISO from different ISOs based on a preset first policy, and determine the first exposure time from different exposure times based on a preset second policy. Then, the camera 193 collects the image based on the first ISO and the first exposure time, and the photographing preview interface is displayed on the display screen 194. For example, the electronic device 100 may determine the first luminous flux based on a correspondence between an ISO, an exposure time, and a luminous flux, and the first luminous flux is a luminous flux corresponding to the first ISO and the first exposure time.

For example, the correspondence between an ISO, an exposure time, and a luminous flux may be shown in Table 1.

TABLE 1

| Luminous flux | Exposure time (unit: second) | | | | | | |
|---|---|---|---|---|---|---|---|
| (unit: piece) | 1/8 | 1/15 | 1/30 | 1/60 | 1/125 | 1/250 | 1/500 |
| ISO 50 | 64 | 32 | 16 | 8 | 4 | 2 | 1 |
| 100 | 128 | 64 | 32 | 16 | 8 | 4 | 2 |
| 200 | 256 | 128 | 64 | 32 | 16 | 8 | 4 |
| 400 | 512 | 256 | 128 | 64 | 32 | 16 | 8 |
| 800 | 1024 | 512 | 256 | 128 | 64 | 32 | 16 |
| 1600 | 2048 | 1024 | 512 | 256 | 128 | 64 | 32 |
| 3200 | 4096 | 2048 | 1024 | 512 | 256 | 128 | 64 |

Table 1 is used as an example. When an ISO is 50 and an exposure time is 1/500 seconds (s), a luminous flux is 1 piece. If the first ISO is 400 and the first exposure time is 1/30s, the first luminous flux is 128 pieces.

Figure 9B:
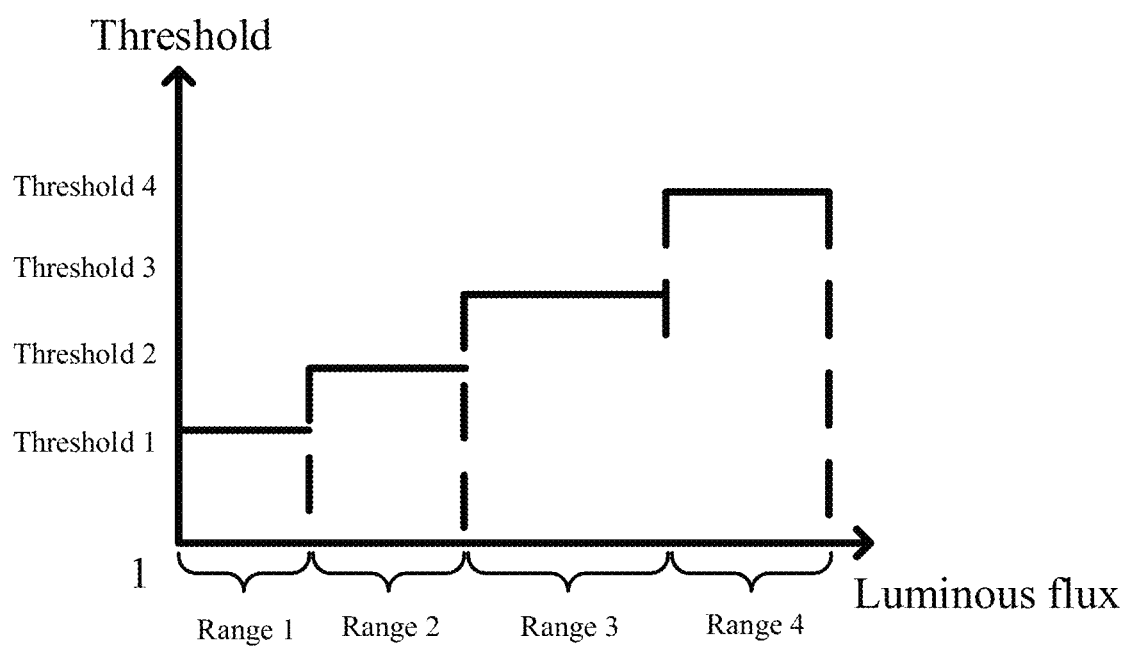
FIG. 9B is a schematic diagram of a correspondence between a luminous flux and a threshold according to an embodiment of this application.

The correspondence between an ISO, an exposure time, and a luminous flux shown in Table 1 is obtained based on different photographing scenarios of the yellow race. For example, as shown in FIG. 9A, the luminous fluxes in Table 1 may be divided into four luminous flux ranges: a luminous flux range 1, a luminous flux range 2, a luminous flux range 3, and a luminous flux range 4. The luminous flux range 1 is {1, 2, 4, 8}, the luminous flux range 2 is {16, 32, 64}, the luminous flux range 3 is {128, 256, 512}, and the luminous flux range 4 is {1024, 2048, 4096}. In this case, to improve reliability of ambient light evaluation, a correspondence between a luminous flux and a threshold may be shown in FIG. 9B. The luminous flux range 1 corresponds to a threshold 1, the luminous flux range 2 corresponds to a threshold 2, the luminous flux range 3 corresponds to a threshold 3, and the luminous flux range 4 corresponds to a threshold 4, where the threshold 1<the threshold 2<the threshold 3<the threshold 4. FIG. 9A and FIG. 9B are used as an example. If the first ISO is 400 and the first exposure time is ⅟₃₀s, the first luminous flux is 128 pieces. In this case, the first luminous flux is within the luminous flux range 3, and therefore, the second threshold is the threshold 3.

Determining the first luminous flux based on the first ISO and the first exposure time helps eliminate impact of white balance and automatic adjustment performed by the camera on parameters (an ISO and an exposure time), thereby improving reliability of ambient light evaluation.

In addition, when the display screen 194 displays the photographing preview interface, if the ambient light intensity is less than the first threshold, and the average grayscale value of the ROI image obtained from the photographing preview interface is less than or equal to the second threshold, the user may be notified that the current ambient light is insufficient. Specifically, for a manner of notifying the user that the current ambient light is insufficient, refer to the foregoing manner of notifying, when the ambient light does not meet the photographing condition, the user that the current ambient light is insufficient. Details are not described herein again.

In some other embodiments, when the display screen 194 displays the photographing preview interface, the electronic device 100 may obtain an ambient light intensity from the ambient light sensor 180L. When the ambient light intensity is greater than a third threshold, the image collected by the camera 193 is automatically photographed. The third threshold may be equal to the first threshold, or the third threshold may be greater than the first threshold. Specifically, a value of the third threshold may be set based on an actual situation.

In this embodiment of this application, to further improve reliability of ambient light evaluation, the ambient light may be evaluated for a plurality of times, to determine whether the ambient light meets the photographing condition. For example, for a skin detection application, imaging quality of photographing affects skin detection precision, and sufficient ambient light is an important condition for obtaining a high-quality photo. Therefore, to ensure that a high-quality photo is obtained, in some embodiments, after determining, for N consecutive times, that current ambient light is sufficient, the electronic device 100 determines that the current ambient light meets a photographing requirement, where N is a positive integer greater than or equal to 1.

For example, the following specifically describes a photographing method in the embodiments of this application with reference to FIG. 7.

Figure 10:
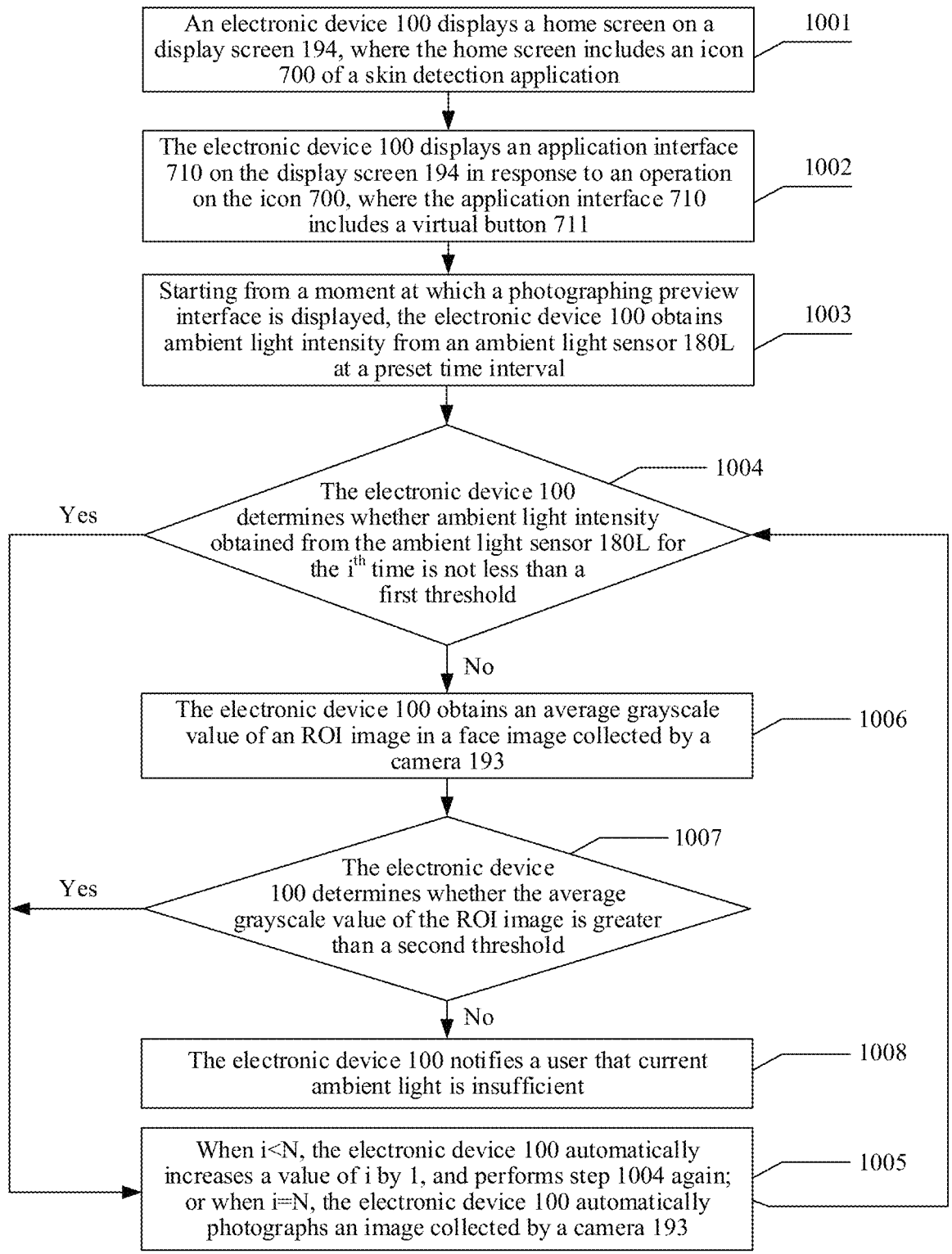
FIG. 10 is a schematic flowchart of a photographing method according to an embodiment of this application.

As shown in FIG. 10, another photographing method according to an embodiment of this application includes the following steps.

Step 1001: An electronic device 100 displays an icon 700 of a skin detection application on a display screen 194.

Step 1002: The electronic device 100 displays an application interface 710 of the skin detection application on the display screen 194 in response to an operation on the icon 700, where the application interface 710 includes a virtual button 711. For example, the virtual button 711 may be named "skin detection" or "photographing".

Step 1003: The electronic device 100 displays a photographing preview interface 720 on the display screen 194 in response to an operation on the virtual button 711. The photographing preview interface 720 is used to display a face image collected by a camera 193. The photographing preview interface 720 may be a photographing preview interface of a camera application 701, or may be a photographing preview interface of the skin detection application.

Step 1004: Starting from a moment at which the photographing preview interface 720 is displayed, the electronic device 100 may obtain an ambient light intensity from an ambient light sensor 180L at a preset time interval. It should be noted that the preset time interval may be correspondingly set depending on a requirement, for example, may be set to 1 s or 2s.

Step 1004: The electronic device 100 determines whether ambient light intensity obtained from the ambient light sensor 180L for the $i^{th}$ time is not less than a first threshold, and if the ambient light intensity is not less than the first threshold, performs step 1005, or if the ambient light intensity is less than the first threshold, performs step 1006, where values of i are N consecutive positive integers from 1 to N (including 1 and N).

Step 1005: When i<N, the electronic device 100 automatically increases a value of i by 1, and performs step 1004 again; or when i=N, the electronic device 100 automatically photographs the image collected by the camera 193.

After the electronic device 100 automatically photographs the image collected by the camera 193, the electronic device 100 may subsequently detect facial skin of a user and the like based on a photo obtained through photographing.

Step 1006: The electronic device 100 obtains an average grayscale value of an ROI image in the photographing preview interface.

Step 1007: The electronic device 100 determines whether the average grayscale value of the ROI image is greater than a second threshold, and if the average grayscale value of the ROI image is greater than the second threshold, performs step 1005, or if the average grayscale value of the ROI image is not greater than the second threshold, performs step 1008.

It should be noted that, for a manner of determining the second threshold, refer to the foregoing manner of determining the second threshold. Details are not described herein again.

Step 1008: The electronic device 100 notifies the user that current ambient light is insufficient. For a notification manner, refer to the foregoing manner of notifying the user that the current ambient light is insufficient. Details are not described herein again.

With reference to the foregoing embodiments and the accompanying drawings, an embodiment of this application provides a photographing method. The method may be implemented in an electronic device 100 having the hardware structure shown in FIG. 1.

Figure 11:
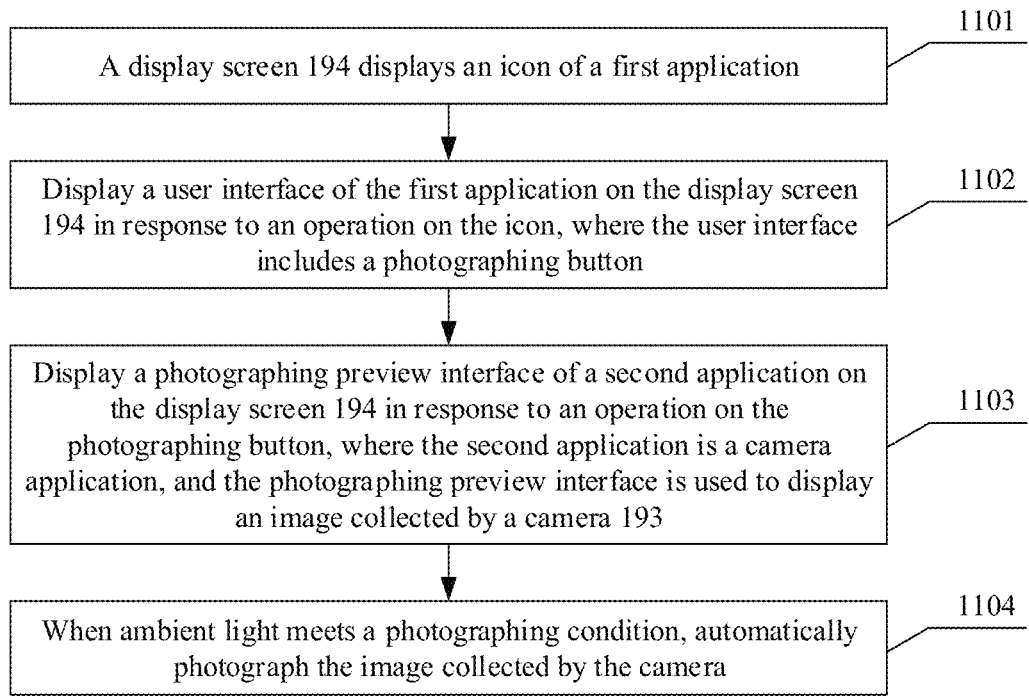
FIG. 11 is a schematic flowchart of another photographing method according to an embodiment of this application.

For example, as shown in FIG. 11, the photographing method in this embodiment of this application includes the following steps.

Step 1101: A display screen 194 displays an icon of a first application.

Step 1102: The electronic device 100 displays a user interface of the first application on the display screen 194 in response to an operation on the icon, where the user interface includes a photographing button.

Step 1103: The electronic device 100 displays a photographing preview interface of a second application on the display screen 194 in response to an operation on the photographing button. The second application is a camera application, and the photographing preview interface is used to display an image collected by a camera 193.

Step 1104: When ambient light meets a photographing condition, the electronic device 100 automatically photographs the image collected by the camera.

For a specific implementation of the photographing method shown in FIG. 11, refer to related descriptions in the foregoing embodiments. Details are not described herein again.

It should be noted that, in the embodiments of this application, the display screen and the camera may be located on the electronic device, or may not be located on the electronic device. For example, the display screen and/or the camera may be connected to the electronic device as an external device, to implement the technical solutions in the embodiments of this application.

It should be understood that the embodiments in accordance with the present disclosure may be used in combination with each other, or each may be used independently.

In the foregoing embodiments, the method provided in those embodiments is described from a perspective of the electronic device serving as an execution body. To implement functions in the method provided in the embodiments of this application, the electronic device may include a hardware structure and/or a software module, and implement the functions in a form of the hardware structure, the software module, or a combination of the hardware structure and the software module. Whether a function in the foregoing functions is performed by using the hardware structure, the software module, or the combination of the hardware structure and the software module depends on specific applications and design constraints of the technical solutions.

Figure 12:
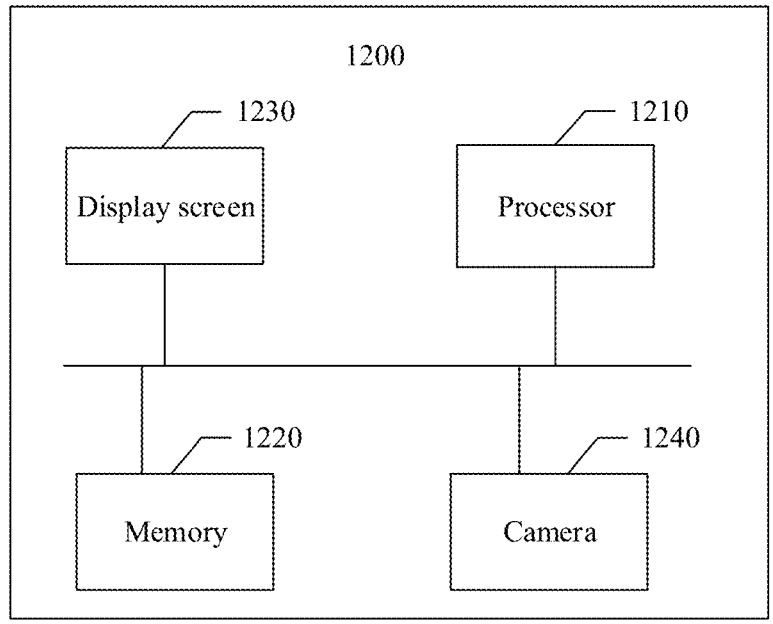
FIG. 12 is a schematic structural diagram of another electronic device according to an embodiment of this application.

Based on a same idea, FIG. 12 shows an electronic device 1200 according to this application. For example, the electronic device 1200 includes at least one processor 1210, a memory 1220, a display screen 1230, and a camera 1240. The processor 1210 is coupled to the memory 1220, the display screen 1230, and the camera 1240. The coupling in this embodiment of this application is indirect coupling or a communications connection between apparatuses, units, or modules, may be in an electrical form, a mechanical form, or another form, and is used for information exchange between the apparatuses, units, or modules.

For example, the memory 1220 is configured to store a program instruction, and the camera 1240 is configured to photograph an external image. The display screen 1230 is configured to display a photographing preview interface when the camera 1240 starts photographing, and the photographing preview interface includes an image collected by the camera 1240. When the processor 1210 invokes the program instruction stored in the memory 1220, the electronic device 1200 is enabled to perform the steps performed by the electronic device in the photographing method shown in FIG. 10 and/or FIG. 11, thereby improving photographing quality.

It should be understood that the electronic device 1200 may be configured to implement the photographing method shown in FIG. 10 and/or FIG. 11 in the embodiments of this application. For related features, refer to the foregoing descriptions. Details are not described herein again.

A person skilled in the art may clearly understand that the embodiments of this application may be implemented by hardware, firmware, or a combination thereof. When the embodiments are implemented by software, the foregoing functions may be stored in a computer readable medium or transmitted as one or more instructions or code in a computer readable medium. The computer readable medium includes a computer storage medium and a communications medium, where the communications medium includes any medium that allows a computer program to be transferred from one place to another. The storage medium may be any available medium that can be accessed by a computer. The computer readable medium may include, for example but not limited to, a RAM, a ROM, an electrically erasable programmable read only memory (EEPROM), a compact disc read-only memory (CD-ROM) or another compact disc storage, a magnetic disk storage medium or another magnetic storage device, or any other medium that can be accessed by a computer and that can be used to carry or store expected program code in a form of an instruction or a data structure. In addition, any connection may be appropriately defined as a computer readable medium. For example, if software is transmitted from a website, a server, or another remote source by using a coaxial cable, an optical fiber or cable, a twisted pair, a digital subscriber line (DSL), or a wireless technology such as infrared, radio, or microwave, the coaxial cable, the optical fiber or cable, the twisted pair, the DSL, or the wireless technology such as infrared, radio, or microwave is included in a definition of a belonged-to medium. A disk and a disc used in the embodiments of this application include a compact disc (CD), a laser disc, an optical disc, a digital versatile disc (DVD), a floppy disk, and a Blu-ray disc. The disk usually magnetically copies data, and the disc optically copies data by using laser. The foregoing combination should also be included in the protection scope of the computer readable medium.

To sum up, the foregoing descriptions are merely embodiments of this application, but are not intended to limit the protection scope of this application. Any modification, equivalent replacement, improvement, or the like made according to the disclosure of this application shall fall within the protection scope of this application.

What is claimed is:

1. A photographing method of an electronic device, wherein the electronic device comprises a display screen and a camera, and the method comprises:
   displaying, by the display screen, an icon of a first application;
   displaying, by the display screen, a user interface of the first application in response to an operation on the icon, wherein the user interface includes a photographing button;
   displaying, by the display screen, a photographing preview interface of a second application in response to an operation on the photographing button, wherein the second application is a camera application, and the photographing preview interface is configured to display an image collected by the camera;
   obtaining an ambient light intensity from an ambient light sensor in the electronic device; and
   determining that an average grayscale value of a region of interest (ROI) in the image is greater than a second threshold, when determining that the ambient light intensity is less than a first threshold, wherein the ROI is obtained in the photographing preview interface; and
   automatically photographing, by the electronic device, the image collected by the camera.

2. The method of claim 1, wherein the method further comprises:

obtaining a first light sensitivity (ISO) and a first exposure time, wherein the first ISO is an ISO determined by the electronic device when the photographing preview interface is displayed, and the first exposure time is an exposure time determined by the electronic device when the photographing preview interface is displayed;

determining a first luminous flux based on the first ISO and the first exposure time; and determining the second threshold based on the first luminous flux.

3. The method of claim 2, wherein the method further comprises:

querying, by the electronic device based on the first luminous flux, a preset correspondence table between a luminous flux and a threshold, to obtain the second threshold, wherein the second threshold is a threshold corresponding to a luminous flux range in which the first luminous flux is; and the correspondence table comprises a first luminous flux range and a second luminous flux range, wherein a minimum luminous flux value in the first luminous flux range is greater than a maximum luminous flux value in the second luminous flux range, the first luminous flux range corresponds to one threshold, the second luminous flux range corresponds to another threshold, and the threshold corresponding to the first luminous flux range is greater than the threshold corresponding to the second luminous flux range.

4. The method of claim 1, further comprising:

determining that the ambient light intensity is greater than a fifth threshold.

5. The method of claim 1, wherein the method further comprises:

notifying a user that current ambient light is insufficient, when determining that the ambient light intensity is less than the first threshold and that the average grayscale value of a region of interest (ROI) in the image is greater than the second threshold.

6. The method of claim 1, wherein the method further comprises:

notifying a user, by using a voice, that current ambient light is insufficient, when determining that the ambient light intensity is less than the first threshold and that the average grayscale value of a region of interest (ROI) in the image is greater than the second threshold.

7. The method of claim 1, wherein the method further comprises:

displaying, by the display screen, prompt information, wherein the prompt information is used to notify a user that a current ambient light is insufficient.

8. An electronic device, comprising:

a display screen;

a camera;

a non-transitory memory comprising instructions; and a processor coupled to the non-transitory memory, the instructions being executed by the processor to cause the electronic device to:

display an icon of a first application;

display a user interface of the first application in response to an operation on the icon, wherein the user interface includes a photographing button;

display a photographing preview interface of a second application in response to an operation on the photographing button, wherein the second application is a camera application, and the photographing preview interface is configured to display an image collected by the camera;

obtain an ambient light intensity from an ambient light sensor in the electronic device;

determine that an average grayscale value of a region of interest (ROI) in the image is greater than a second threshold, when determining that the ambient light intensity is less than a first threshold, wherein the ROI is obtained in the photographing preview interface; and automatically photograph the image collected by the camera.

9. The electronic device of claim 8, the instructions further cause the electronic device to:

obtain a first light sensitivity (ISO) and a first exposure time, wherein the first ISO is an ISO determined by the electronic device when the photographing preview interface is displayed, and the first exposure time is an exposure time determined by the electronic device when the photographing preview interface is displayed;

determine a first luminous flux based on the first ISO and the first exposure time; and determine the second threshold based on the first luminous flux.

10. The electronic device of claim 9, the instructions further cause the electronic device to:

query a preset correspondence table between a luminous flux and a threshold, based on the first luminous flux, to obtain the second threshold, wherein the second threshold is a threshold corresponding to a luminous flux range in which the first luminous flux is; and, wherein the correspondence table comprises a first luminous flux range and a second luminous flux range, wherein a minimum luminous flux value in the first luminous flux range is greater than a maximum luminous flux value in the second luminous flux range, the first luminous flux range corresponds to one threshold, the second luminous flux range corresponds to another threshold, and the threshold corresponding to the first luminous flux range is greater than the threshold corresponding to the second luminous flux range.

11. The electronic device of claim 8, wherein the instructions further cause the electronic device to:

determine that the ambient light intensity is greater than a fifth threshold.

12. The electronic device of claim 8, the instructions further cause the electronic device to:

notify a user that current ambient light is insufficient, when determining that the ambient light intensity is less than the first threshold and that the average grayscale value of a region of interest (ROI) in the image is greater than the second threshold.

13. The electronic device of claim 8, the instructions further cause the electronic device to:

notify a user, by using a voice, that current ambient light is insufficient, when determining that the ambient light intensity is less than the first threshold and that the average grayscale value of a region of interest (ROI) in the image is greater than the second threshold.

14. The electronic device of claim 8, the instructions further cause the electronic device to:

display prompt information, wherein the prompt information is used to notify a user that a current ambient light is insufficient.

15. A computer program product for photographing, the computer program product comprising computer instructions stored on a non-transitory computer readable medium, wherein the computer instructions, when executed, implement a method comprising:

displaying an icon of a first application;

displaying a user interface of the first application in response to an operation on the icon, wherein the user interface includes a photographing button;

displaying a photographing preview interface of a second application in response to an operation on the photographing button, wherein the second application is a camera application, and the photographing preview interface is configured to display an image collected by a camera;

obtaining an ambient light intensity from an ambient light sensor; and determining that an average grayscale value of a region of interest (ROI) in the image is greater than a second threshold, when determining that the ambient light intensity is less than a first threshold, wherein the ROI is obtained in the photographing preview interface; and automatically photographing the image collected by the camera.

16. The computer program product of claim 15, wherein the method further comprises:

obtaining a first light sensitivity (ISO) and a first exposure time, wherein the first ISO is an ISO determined when the photographing preview interface is displayed, and the first exposure time is an exposure time determined when the photographing preview interface is displayed;

determining a first luminous flux based on the first ISO and the first exposure time; and determining a second threshold based on the first luminous flux.

17. The computer program product of claim 16, wherein the method further comprises:

querying a preset correspondence table between a luminous flux and a threshold, based on a first luminous flux, to obtain a second threshold, wherein the second threshold is a threshold corresponding to a luminous flux range in which the first luminous flux is; and the correspondence table comprises a first luminous flux range and a second luminous flux range, wherein a minimum luminous flux value in the first luminous flux range is greater than a maximum luminous flux value in the second luminous flux range, the first luminous flux range corresponds to one threshold, the second luminous flux range corresponds to another threshold, and the threshold corresponding to the first luminous flux range is greater than the threshold corresponding to the second luminous flux range.

* * * * *